(12) United States Patent
Kludt et al.

(10) Patent No.: US 9,332,519 B2
(45) Date of Patent: *May 3, 2016

(54) SYSTEM AND METHOD FOR SELECTIVE REGISTRATION IN A MULTI-BEAM SYSTEM

(71) Applicant: Magnolia Broadband Inc., Englewood, NJ (US)

(72) Inventors: Kenneth Kludt, San Jose, CA (US); Haim Harel, New York, NY (US)

(73) Assignee: MAGNOLIA BROADBAND INC., Englewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,114

(22) Filed: Oct. 17, 2014

(65) Prior Publication Data

US 2015/0141010 A1 May 21, 2015

Related U.S. Application Data

(62) Division of application No. 14/085,252, filed on Nov. 20, 2013, now Pat. No. 8,942,134.

(51) Int. Cl.
| | |
|---|---|
| *H04L 12/28* | (2006.01) |
| *H04W 60/00* | (2009.01) |
| *H04W 48/20* | (2009.01) |
| *H04W 16/28* | (2009.01) |

(Continued)

(52) U.S. Cl.
CPC ............... *H04W 60/00* (2013.01); *H04B 7/022* (2013.01); *H04B 7/0434* (2013.01); *H04B 7/0617* (2013.01); *H04W 16/28* (2013.01); *H04W 48/20* (2013.01); *H04W 72/046* (2013.01); *H04W 84/12* (2013.01)

(58) Field of Classification Search
USPC .......................................... 370/252, 329, 338
See application file for complete search history.

(56) References Cited

U.S. PATENT DOCUMENTS

| 4,044,359 A | 8/1977 | Applebaum et al. |
| 4,079,318 A | 3/1978 | Kinoshita |

(Continued)

FOREIGN PATENT DOCUMENTS

| EP | 1 189 303 | 3/2002 |
| EP | 1 867 177 | 5/2010 |

(Continued)

OTHER PUBLICATIONS

U.S. Appl. No. 13/858,302, filed Apr. 8, 2013, Harel et al.

(Continued)

*Primary Examiner* — John Pezzlo
(74) *Attorney, Agent, or Firm* — Pearl Cohen Zedek Latzer Baratz LLP

(57) ABSTRACT

A system and method for selective registration of a user equipment (UE) to one of a plurality of access points (APs). An indication may be received that each of a plurality of APs have received a signal from a UE. The UE may be registered to the first one of the plurality of APs to satisfy registration requirements associated with the UE. Information may be reported to a controller related to the signal strength of communication received at each AP from the UE. If the signal strength received at the registered AP is less than the signal strength received at one or more of the non-registered APs by more than a threshold amount, the registration of the UE to the registered AP may be rejected.

6 Claims, 15 Drawing Sheets

(51) Int. Cl.
*H04B 7/06* (2006.01)
*H04B 7/02* (2006.01)
*H04B 7/04* (2006.01)
H04J 1/16 (2006.01)
H04W 72/04 (2009.01)
H04W 84/12 (2009.01)

(56) References Cited

U.S. PATENT DOCUMENTS

| | | |
|---|---|---|
| 4,359,738 A | 11/1982 | Lewis |
| 4,540,985 A | 9/1985 | Clancy et al. |
| 4,628,320 A | 12/1986 | Downie |
| 5,162,805 A | 11/1992 | Cantrell |
| 5,363,104 A | 11/1994 | Richmond |
| 5,444,762 A | 8/1995 | Frey et al. |
| 5,732,075 A | 3/1998 | Tangemann et al. |
| 5,915,215 A | 6/1999 | Williams et al. |
| 5,936,577 A | 8/1999 | Shoki et al. |
| 5,940,033 A | 8/1999 | Locher et al. |
| 6,018,317 A | 1/2000 | Dogan et al. |
| 6,026,081 A | 2/2000 | Hamabe |
| 6,046,655 A | 4/2000 | Cipolla |
| 6,094,165 A | 7/2000 | Smith |
| 6,101,399 A | 8/2000 | Raleigh et al. |
| 6,163,695 A | 12/2000 | Takemura |
| 6,167,286 A | 12/2000 | Ward et al. |
| 6,215,812 B1 | 4/2001 | Young et al. |
| 6,226,507 B1 | 5/2001 | Ramesh et al. |
| 6,230,123 B1 | 5/2001 | Mekuria et al. |
| 6,259,683 B1 | 7/2001 | Sekine et al. |
| 6,297,772 B1 | 10/2001 | Lewis |
| 6,321,077 B1 | 11/2001 | Saitoh et al. |
| 6,335,953 B1 | 1/2002 | Sanderford et al. |
| 6,370,378 B1 | 4/2002 | Yahagi |
| 6,377,783 B1 | 4/2002 | Lo et al. |
| 6,393,282 B1 | 5/2002 | Iimori |
| 6,584,115 B1 | 6/2003 | Suzuki |
| 6,647,276 B1 | 11/2003 | Kuwahara et al. |
| 6,697,622 B1 | 2/2004 | Ishikawa et al. |
| 6,697,633 B1 | 2/2004 | Dogan et al. |
| 6,735,182 B1 | 5/2004 | Nishimori et al. |
| 6,834,073 B1 | 12/2004 | Miller et al. |
| 6,842,460 B1 | 1/2005 | Olkkonen et al. |
| 6,914,890 B1 | 7/2005 | Tobita et al. |
| 6,927,646 B2 | 8/2005 | Niemi |
| 6,934,541 B2 | 8/2005 | Miyatani |
| 6,975,582 B1 | 12/2005 | Karabinis et al. |
| 6,987,958 B1 | 1/2006 | Lo et al. |
| 7,068,628 B2 | 6/2006 | Li et al. |
| 7,154,960 B2 | 12/2006 | Liu et al. |
| 7,177,663 B2 | 2/2007 | Axness et al. |
| 7,190,964 B2 | 3/2007 | Damnjanovic et al. |
| 7,257,425 B2 | 8/2007 | Wang et al. |
| 7,299,072 B2 | 11/2007 | Ninomiya |
| 7,391,757 B2 | 6/2008 | Haddad et al. |
| 7,392,015 B1 | 6/2008 | Farlow et al. |
| 7,474,676 B2 | 1/2009 | Tao et al. |
| 7,499,109 B2 | 3/2009 | Kim et al. |
| 7,512,083 B2 | 3/2009 | Li |
| 7,606,528 B2 | 10/2009 | Mesecher |
| 7,634,015 B2 | 12/2009 | Waxman |
| 7,646,744 B2 | 1/2010 | Li |
| 7,719,993 B2 | 5/2010 | Li et al. |
| 7,742,000 B2 | 6/2010 | Mohamadi |
| 7,769,107 B2 | 8/2010 | Sandhu et al. |
| 7,876,848 B2 | 1/2011 | Han et al. |
| 7,881,401 B2 | 2/2011 | Kraut et al. |
| 7,898,478 B2 | 3/2011 | Niu et al. |
| 7,904,086 B2 | 3/2011 | Kundu et al. |
| 7,904,106 B2 | 3/2011 | Han et al. |
| 7,933,255 B2 | 4/2011 | Li |
| 7,970,366 B2 | 6/2011 | Arita et al. |
| 7,986,718 B2 * | 7/2011 | Monier ............. G01D 4/004 370/255 |
| 8,078,109 B1 | 12/2011 | Mulcay |
| 8,103,284 B2 | 1/2012 | Mueckenheim et al. |
| 8,111,782 B2 | 2/2012 | Kim et al. |
| 8,115,679 B2 | 2/2012 | Falk |
| 8,155,613 B2 | 4/2012 | Kent et al. |
| 8,194,602 B2 | 6/2012 | van Rensburg et al. |
| 8,275,377 B2 | 9/2012 | Nanda et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,315,671 B2 | 11/2012 | Kuwahara et al. |
| 8,369,436 B2 | 2/2013 | Stirling-Gallacher |
| 8,504,098 B2 | 8/2013 | Khojastepour |
| 8,509,190 B2 | 8/2013 | Rofougaran |
| 8,520,657 B2 | 8/2013 | Rofougaran |
| 8,526,886 B2 | 9/2013 | Wu et al. |
| 8,571,127 B2 | 10/2013 | Jiang et al. |
| 8,588,844 B2 | 11/2013 | Shpak |
| 8,599,955 B1 | 12/2013 | Kludt et al. |
| 8,599,979 B2 | 12/2013 | Farag et al. |
| 8,605,658 B2 | 12/2013 | Fujimoto |
| 8,611,288 B1 | 12/2013 | Zhang et al. |
| 8,644,413 B2 | 2/2014 | Harel et al. |
| 8,649,458 B2 | 2/2014 | Kludt et al. |
| 8,666,319 B2 | 3/2014 | Kloper et al. |
| 8,670,504 B2 | 3/2014 | Naguib |
| 8,744,511 B2 | 6/2014 | Jones et al. |
| 8,754,810 B2 | 6/2014 | Guo et al. |
| 8,767,862 B2 | 7/2014 | Abreu et al. |
| 8,774,150 B1 | 7/2014 | Jeffery et al. |
| 8,780,743 B2 | 7/2014 | Sombrutzki et al. |
| 8,797,969 B1 | 8/2014 | Harel et al. |
| 8,891,598 B1 | 11/2014 | Wang et al. |
| 8,976,845 B2 | 3/2015 | O'Keeffe et al. |
| 9,014,066 B1 | 4/2015 | Wang et al. |
| 9,035,828 B2 | 5/2015 | O'Keeffe et al. |
| 2001/0029326 A1 | 10/2001 | Diab et al. |
| 2001/0038665 A1 | 11/2001 | Baltersee et al. |
| 2002/0024975 A1 | 2/2002 | Hendler |
| 2002/0051430 A1 | 5/2002 | Kasami et al. |
| 2002/0065107 A1 | 5/2002 | Harel et al. |
| 2002/0085643 A1 | 7/2002 | Kitchener et al. |
| 2002/0107013 A1 | 8/2002 | Fitzgerald |
| 2002/0115474 A1 | 8/2002 | Yoshino et al. |
| 2002/0181426 A1 | 12/2002 | Sherman |
| 2002/0181437 A1 | 12/2002 | Ohkubo et al. |
| 2003/0045241 A1* | 3/2003 | Noerpel ............. H04B 7/18539 455/67.11 |
| 2003/0087645 A1 | 5/2003 | Kim et al. |
| 2003/0114162 A1 | 6/2003 | Chheda et al. |
| 2003/0153322 A1 | 8/2003 | Burke et al. |
| 2003/0153360 A1 | 8/2003 | Burke et al. |
| 2003/0186653 A1 | 10/2003 | Mohebbi et al. |
| 2003/0203717 A1 | 10/2003 | Chuprun et al. |
| 2003/0203743 A1 | 10/2003 | Sugar et al. |
| 2004/0023693 A1 | 2/2004 | Okawa et al. |
| 2004/0056795 A1 | 3/2004 | Ericson et al. |
| 2004/0063455 A1 | 4/2004 | Eran et al. |
| 2004/0081144 A1 | 4/2004 | Martin et al. |
| 2004/0121810 A1 | 6/2004 | Goransson et al. |
| 2004/0125899 A1 | 7/2004 | Li et al. |
| 2004/0125900 A1 | 7/2004 | Liu et al. |
| 2004/0142696 A1 | 7/2004 | Saunders et al. |
| 2004/0147266 A1 | 7/2004 | Hwang et al. |
| 2004/0156399 A1 | 8/2004 | Eran |
| 2004/0166902 A1 | 8/2004 | Castellano et al. |
| 2004/0198292 A1 | 10/2004 | Smith et al. |
| 2004/0228388 A1 | 11/2004 | Salmenkaita |
| 2004/0235527 A1 | 11/2004 | Reudink et al. |
| 2004/0264504 A1 | 12/2004 | Jin |
| 2005/0068230 A1 | 3/2005 | Munoz et al. |
| 2005/0068918 A1 | 3/2005 | Mantravadi et al. |
| 2005/0075140 A1 | 4/2005 | Famolari |
| 2005/0085266 A1 | 4/2005 | Narita |
| 2005/0129155 A1 | 6/2005 | Hoshino |
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0250544 A1 | 11/2005 | Grant et al. |

(56) References Cited

U.S. PATENT DOCUMENTS

| | | |
|---|---|---|
| 2005/0254513 A1 | 11/2005 | Cave et al. |
| 2005/0265436 A1 | 12/2005 | Suh et al. |
| 2005/0286440 A1 | 12/2005 | Strutt et al. |
| 2005/0287962 A1 | 12/2005 | Mehta et al. |
| 2006/0041676 A1 | 2/2006 | Sherman |
| 2006/0092889 A1 | 5/2006 | Lyons et al. |
| 2006/0094372 A1 | 5/2006 | Ahn et al. |
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1 | 2/2008 | Molnar et al. |
| 2008/0081671 A1 | 4/2008 | Wang et al. |
| 2008/0095163 A1 | 4/2008 | Chen et al. |
| 2008/0108352 A1 | 5/2008 | Montemurro et al. |
| 2008/0125120 A1* | 5/2008 | Gallagher et al. ......... 455/435.2 |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1 | 4/2010 | Francos et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0012134 A1 | 1/2013 | Jin et al. |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |

(56) References Cited

U.S. PATENT DOCUMENTS

| | | | |
|---|---|---|---|
| 2013/0095780 A1 | 4/2013 | Prazan et al. | |
| 2013/0101073 A1 | 4/2013 | Zai et al. | |
| 2013/0150012 A1 | 6/2013 | Chhabra et al. | |
| 2013/0156016 A1 | 6/2013 | Debnath et al. | |
| 2013/0156120 A1 | 6/2013 | Josiam et al. | |
| 2013/0170388 A1 | 7/2013 | Ito et al. | |
| 2013/0172029 A1 | 7/2013 | Chang et al. | |
| 2013/0190006 A1 | 7/2013 | Kazmi et al. | |
| 2013/0208587 A1 | 8/2013 | Bala et al. | |
| 2013/0208619 A1 | 8/2013 | Kudo et al. | |
| 2013/0223400 A1 | 8/2013 | Seo et al. | |
| 2013/0229996 A1 | 9/2013 | Wang et al. | |
| 2013/0229999 A1 | 9/2013 | Da Silva et al. | |
| 2013/0235720 A1 | 9/2013 | Wang et al. | |
| 2013/0242853 A1 | 9/2013 | Seo et al. | |
| 2013/0242899 A1 | 9/2013 | Lysejko et al. | |
| 2013/0242965 A1 | 9/2013 | Horn et al. | |
| 2013/0242976 A1 | 9/2013 | Katayama et al. | |
| 2013/0252621 A1 | 9/2013 | Dimou et al. | |
| 2013/0272437 A1 | 10/2013 | Eidson et al. | |
| 2013/0301551 A1 | 11/2013 | Ghosh et al. | |
| 2013/0331136 A1 | 12/2013 | Yang et al. | |
| 2013/0343369 A1 | 12/2013 | Yamaura | |
| 2014/0010089 A1 | 1/2014 | Cai et al. | |
| 2014/0010211 A1 | 1/2014 | Asterjadhi et al. | |
| 2014/0029433 A1 | 1/2014 | Wentink | |
| 2014/0071873 A1 | 3/2014 | Wang et al. | |
| 2014/0086077 A1 | 3/2014 | Safavi | |
| 2014/0086081 A1 | 3/2014 | Mack et al. | |
| 2014/0098681 A1 | 4/2014 | Stager et al. | |
| 2014/0119288 A1 | 5/2014 | Zhu et al. | |
| 2014/0185501 A1 | 7/2014 | Park et al. | |
| 2014/0185535 A1 | 7/2014 | Park et al. | |
| 2014/0192820 A1 | 7/2014 | Azizi et al. | |
| 2014/0204821 A1 | 7/2014 | Seok et al. | |
| 2014/0241182 A1 | 8/2014 | Smadi | |
| 2014/0242914 A1 | 8/2014 | Monroe | |
| 2014/0293869 A1 | 10/2014 | Jeffery et al. | |
| 2014/0307653 A1 | 10/2014 | Liu et al. | |
| 2014/0313986 A1 | 10/2014 | Jeffery et al. | |
| 2014/0334312 A1 | 11/2014 | Rivingston et al. | |
| 2015/0016438 A1 | 1/2015 | Harel et al. | |
| 2015/0018042 A1* | 1/2015 | Radulescu et al. | 455/561 |
| 2015/0085777 A1 | 3/2015 | Seok | |
| 2015/0124634 A1 | 5/2015 | Harel et al. | |
| 2015/0139212 A1 | 5/2015 | Wang et al. | |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

U.S. Appl. No. 14/085,352, filed Nov. 20, 2013, Kludt et al.
Office Action issued by the United States Patent and Trademark Office for U.S. Appl. No. 13/630,146 dated Jan. 22, 2013.
Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.

(56) References Cited

OTHER PUBLICATIONS

Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, no. Ljubljana; Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F-06921 Sophia-Antipolis Cedex; France, vol. RAN WG1, no. Valencia, Spain; Jan. 18, 2010, Jan. 12, 2010, pp. 1-5.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference On, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.

(56) References Cited

OTHER PUBLICATIONS

Notice of Allowance issued by the United States Patent and Trademark Office for U.S. Appl. No. 14/273,866 dated Mar. 25, 2015.
Notice of Allowance issued by the United States Patent and Trademark Office for U.S. Appl. No. 13/925,454 dated Apr. 14, 2015.
Office Action issued by the United States Patent and Trademark Office for U.S. Appl. No. 14/543,357 dated Apr. 23, 2015.
Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
Notice of Allowance issued by the United States Patent and Trademark Office for U.S. Appl. No. 14/480,920 dated Jun. 22, 2015.
International Search Report and Written Opinion for PCT International Application No. PCT/US2014/062116 dated Jun. 22, 2015.
Office Action issued by the United States Patent and Trademark Office for U.S. Appl. No. 14/467,415 dated Jun. 30, 2015.

\* cited by examiner

Figure 8. Exemplary radiation pattern of 4 beam antenna using 4 antennas and Butler matrix beamformer [800]

Figure 9. Functional diagram for tapering and sidelobe cancelling (Analog or Digital) [900]

SYSTEM AND METHOD FOR SELECTIVE REGISTRATION IN A MULTI-BEAM SYSTEM

CROSS REFERENCE TO RELATED APPLICATIONS

This application is a divisional application of U.S. Ser. No. 14/085,252, filed on Nov. 20, 2013, which is incorporated in its entirety herein by reference.

FIELD OF THE INVENTION

The present invention relates generally to the field of radio frequency (RF) multiple-input-multiple-output (MIMO) systems and in particular to systems and methods for enhanced performance of RF MIMO systems using RF beamforming and/or digital signal processing (DSP). Embodiments of the present invention relate to the following fields and technologies: WiFi, Institute of Electrical and Electronics Engineers (IEEE) 802.11a, b, g, n, ac standards, antenna arrays, side lobe reduction, receivers, transmitters, beamforming, DSP, digital filtering, analog and digital signal cancellation and interference mitigation.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF and/or digital circuitry that implements beamforming and includes combiners and phase shifters or delays and in some cases amplifiers and/or attenuators to adjust the weights of signals to or from each antenna in an antenna array. Digital beamformers may be implemented in digital circuitry such as a digital signal processor (DSP), field-programmable gate array (FPGA), microprocessor or the CPU of a computer to set the weights (phases and amplitudes) of the above signals. Various techniques are used to implement beamforming such as using a Butler matrix, Blass Matrix, Rotman Lens and/or phased array of antennas. In general, most approaches to beamforming attempt to provide simultaneous coverage within a sector using multiple beams.

WiFi has been implemented with a limited amount of frequency resources that use techniques of collision avoidance to allow multiple user equipment (UEs) to share the same channel. As the numbers of UEs proliferate, the impact of such a scheme restricts the ability of a base station Access Point (AP) to support many users without impacting the performance to and from each. This invention discloses an apparatus and methods to allow the reuse of resources by implementing AP clusters using multi-beam antennas breaking down a sector area of coverage into smaller subsectors. In order to accomplish this, several limitations of multi-beam antennas must be addressed. First, since WiFi is a time division multiplex system (TDD), the transmitting and receiving functions use the same channel. Unsynchronized operation between APs means a transmitting AP's signal may interfere with the reception of another AP that uses the same channel unless sufficient isolation (e.g., 125 dB) is provided between the transmitting and receiving functions. Prior art cited above addresses the problem by using physically separated antenna arrays for transmit and receive and by providing cancellation of each transmitted signal within the receiver processing functions. Another limitation is that multi-beam antennas do not offer infinite separation of the coverage of one beam to the others. The following discusses the impacts of this performance limitation and presents approaches to mitigate its effect.

SUMMARY OF EMBODIMENTS OF THE INVENTION

Beamforming networks include multi-beam antenna arrays to provide multiple beams pointed at different directions to independently communicate with multiple respective APs. In order to provide continuous coverage to UEs throughout a sector, the coverage of adjacent beams of a multi-beam antenna overlap. This presents a potential for interference when adjacent beams illuminate the same area on the same frequencies or channel. In order to reduce such interference from one beam to another, adjacent beams may provide communication over different channels.

To register to an AP, UEs typically scan channels for an available AP and stop searching upon finding a first AP that satisfies their registration requirements. However, when a communication link is sufficiently strong, APs and/or frequencies outside of the UE's optimal range may provide sufficiently strong signals to satisfy the UE's registration requirements, causing the UE to register to a sub-optimal AP. Further, as a UE moves from one beam to the next, commonly referred to as "roaming," an AP and/or frequency that is optimal in one location becomes sub-optimal as the UE travels to another location. The problem of roaming may be compounded for UEs that are close to APs since they travel across beams more quickly and, because of their proximity to the antennas, experience relatively good communication causing registration to the "wrong" AP to be more likely.

According to an embodiment of the invention, a system and method is provided for detecting registration to sub-optimal APs and/or frequencies and providing means to re-register the UE to an optimal AP and/or frequency.

According to an embodiment of the invention, a system and method is provided for selective registration of a user equipment (UE) to one of a plurality of access points (APs) in a multi-beam system. An indication may be received that each of a plurality of APs have received a signal from a single UE. The UE may communicate with each AP over an associated beam that includes a primary lobe providing a relatively higher signal strength surrounded by one or more sidelobes providing a relatively lower signal strength. The UE may register to a first one of the plurality of APs that satisfies registration requirements associated with the UE. The registration of the UE to the registered AP may be maintained if the UE communicates with the registered AP over a primary lobe providing a greater than threshold relative signal strength relative to the other (non-registered) APs, whereas the registration of the UE to the registered AP may be rejected when the UE communicates with the registered AP over a sidelobe or over a primary lobe providing a less than threshold relative signal strength relative to the other APs.

According to an embodiment of the invention, a system and method is provided for selective registration of a UE to one of a plurality of access points (APs). An indication may be received that each of a plurality of APs have received a signal from a user equipment (UE). The UE may be registered to the first one of the plurality of APs to satisfy registration requirements associated with the UE. Information may be reported to a controller related to the signal strength of communication received at each AP from the UE. If the signal strength received at the registered AP is less than the signal strength received at one or more of the non-registered APs by more than a threshold amount, the registration of the UE to the registered AP may be rejected.

Another problem in multi-beam systems is sidelobe interference caused by non-ideal directivity of the beams. A beam may include a primary lobe (PL) pointed along a main axis or direction of the beam and which typically provides relatively high signal gain, amplitude or power. The primary lobe may be surrounded by a sidelobe (SL), which may be an echo of the primary lobe, and which typically provides relatively lower signal gain, amplitude or power. Sidelobes (SL) radiate in directions askew from the main direction or axis of the beam and thus, are typically a source of interference when transmitting in those other sidelobe directions. Sidelobes may simultaneously receive energy, not only from UEs along the beam path, but also from UEs that are not located within the beam path.

Various techniques may be used to reduce, suppress or cancel sidelobe signals. One sidelobe suppression technique is referred to as "tapering" or "Taylor weighting," in which the gain or amplitude of each antenna element may be weighted differently depending on its position in the antenna array. Typically the gain or amplitude of an antennae element is weighted lower the farther the antenna is positioned from the center of the antenna array. However, to achieve acceptable performance, tapering typically requires antenna arrays with a substantially large number of antenna elements (e.g. greater than eight).

According to an embodiment of the invention, a system and method is provided for sidelobe suppression with any number (e.g. four) antenna elements.

According to an embodiment of the invention, a system and method is provided for selective suppression of sidelobe signals using controlled signal cancellation. An indication may be received that a signal from a single user equipment (UE) is received at each of two or more access points (APs) over the same channel. The relatively stronger power signal may be received over a primary lobe of a communication beam of one of the APs and the relatively weaker power signal may be received over a side lobe of a communication beam of another one of the APs. The efficacy of signal cancellation may be tested by turning signal cancellation on and off to measure the UE signals received at one of the APs. If interference is lower when signal cancellation is turned on, said signal cancellation may be applied for continued communication with said UE to cancel side lobe signals and if interference is lower when signal cancellation is turned off, said UE may be communicated with without applying said signal cancellation.

According to an embodiment of the invention, a system and method is provided for selective suppression of sidelobe signals using controlled signal cancellation. Signals may be transmitted/received to/from a plurality of access points (APs) along the direction of a plurality of (N) different respective beams, wherein each of the plurality of (N) beams includes a primary lobe providing relatively high signal power surrounded by two or more side lobes providing relatively low signal power, wherein a primary lobe of one beam is substantially separated from a primary lobe of an adjacent beam communicating over the same channel but at least partially overlapping one or more side lobes of the adjacent beam. It may be determined if user equipment (UE) detected by two or more APs is communicating using a side lobe signal or a primary lobe signal. Signal cancellation may be applied to suppress the sidelobe signals if the UE is determined to communicate using a sidelobe signal but not applied if the UE is determined to communicate using a primary lobe signal.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION OF EMBODIMENTS OF THE INVENTION

Figure 1:
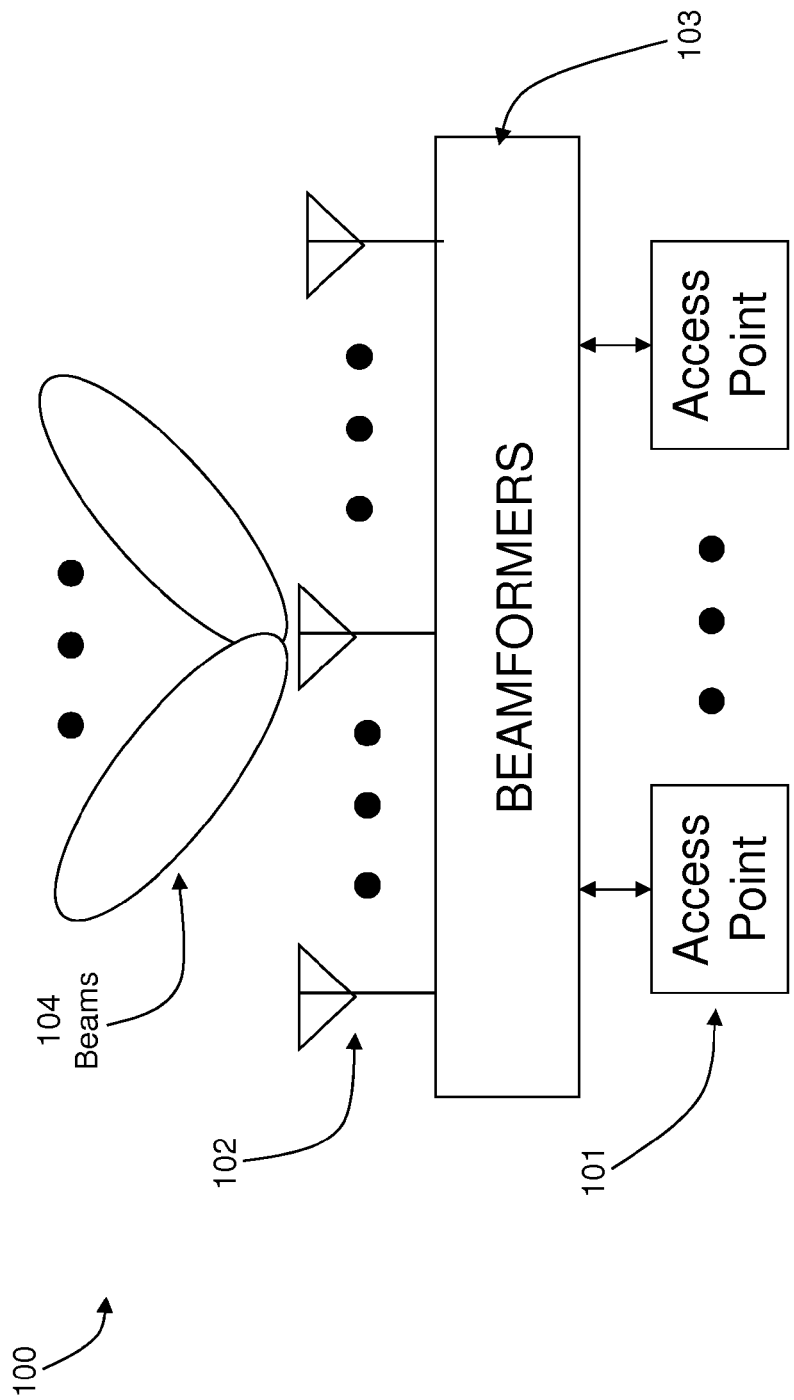
FIG. 1 is a schematic illustration of a multi-beam system including a plurality of access points driving one or more beamformers and an antenna array to create a plurality of beams in accordance with an embodiment of the invention.

It is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. For example, although the following figures describe four or eight beam systems, any number of a plurality of beams may be used greater than or equal to two. Also, it is to be understood that the phraseology and terminology employed herein is for the purpose of description and should not be regarded as limiting.

Reference is made to FIG. 1, which schematically illustrates a multi-beam system 100 including a plurality of access points 101 driving one or more beamformers 103 and an antenna array 102 to create a plurality of beams 104 in accordance with an embodiment of the invention. Each of the plurality of beams 104 may be pointed toward different directions to spatially divide communication into multiple transmission zones using phased array technology. The zones may be divided in one-dimension (along the azimuth direction only) or in two-dimensions (along the azimuth and zenith/elevation directions). Each access point 101 may independently control a single corresponding beam 104 to simultaneously communicate independently with the user equipment in each zone using the same radio channel. Each zone may be occupied by zero, one or multiple mobile devices serviced by a single beam or data stream.

Figure 2:
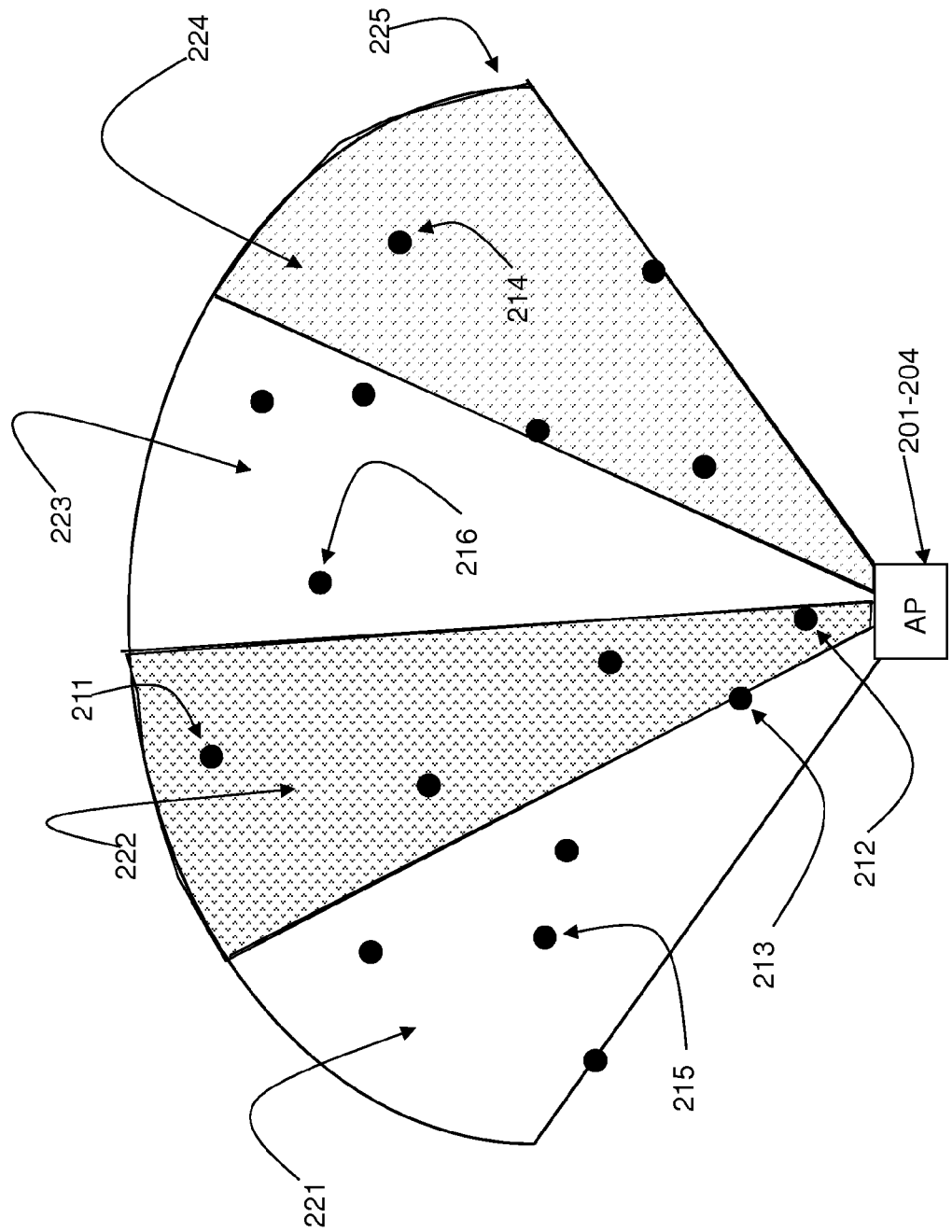
FIG. 2 is a schematic illustration of a sector coverage area subdivided into subsector zones covered by multiple beams in accordance with an embodiment of the invention.

Reference is made to FIG. 2, which schematically illustrates a sector coverage area 225 subdivided into subsector zones covered by multiple beams 221-224 in accordance with an embodiment of the invention. UEs 211-216 located in the subsector zones may communicate with access points 201-204 over beams 221-224. User devices may scan the channels for the first available access point that satisfies its registration requirements. User device 215 in the zone covered by beam 221 may register to access point 201, user devices 212 and 211 in the zone covered by beam 222 may register to access point 202, user device 216 in the zone covered by beam 223 may register to access point 203, and user device 214 in the zone covered by beam 224 may register to access point 204. A user device 213 near zone boundaries may register to either access point 201 or 202. Although FIG. 2 shows an idealized partition of area 225 into subsector zones with adjacent beams having perfectly coinciding and non-overlapping boundaries, adjacent beams may overlap causing interference (e.g. see FIGS. 5 and 6).

Figure 3:
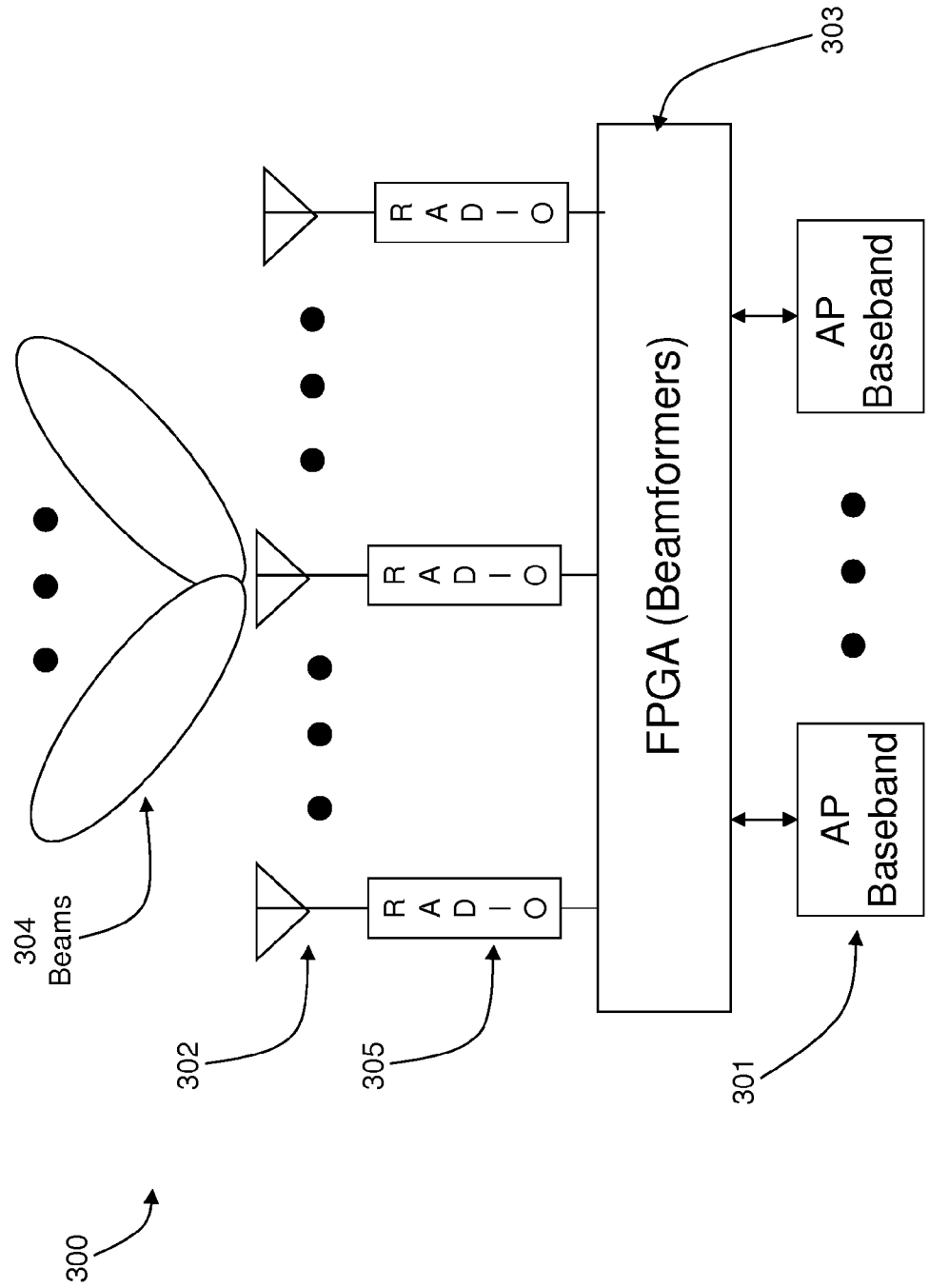
FIG. 3 is a schematic illustration of a multi-beam system using digital beamformers in accordance with an embodiment of the invention.

Reference is made to FIG. 3, which schematically illustrates a multi-beam system 300 using digital beamformers 303 in accordance with an embodiment of the invention. To transmit signals over multiple beams 304, a plurality of AP baseband stations 301 may provide baseband signals to digital beamformers contained in logical block elements of beamformers 303. Beamformers 303 may output digitized intermediate frequency (IF) signals that are converted to analog signals in radios 305, upconverted, and then radiated by antennas 302 to create radiated beams 304. To receive signals over multiple beams 304, the process is reversed. Signals received over beams 304 by antennas 302 are amplified, downconverted and digitized in radios 305. The digitized IF signals may then be processed by the beamformer logical block elements of beamformers 303 to isolate the individual received beam signals and route those signals to the appropriate AP baseband station 301.

In WiFi systems, an AP typically transmits and receives signals over the same frequency at alternating times using a time division duplex (TDD) protocol. Ideally, each individual AP should not create interference between transmitted and received signals because the AP will not be transmitting and receiving at the same time. However, in multi-beam systems (e.g. system 100 of FIG. 1) using multiple APs (e.g. APs 101 of FIG. 1), one AP may be transmitting at the same time as another AP is receiving. Accordingly, transmitted signals from the one AP may be coupled to the receiving circuits of the other AP and create interference at that AP. Such coupling may be due to insufficient isolation between transmit and receive circuits. One way to mitigate the problem of coupling is to physically separate the transmit and receive antenna arrays as shown in FIG. 4.

Figure 4:
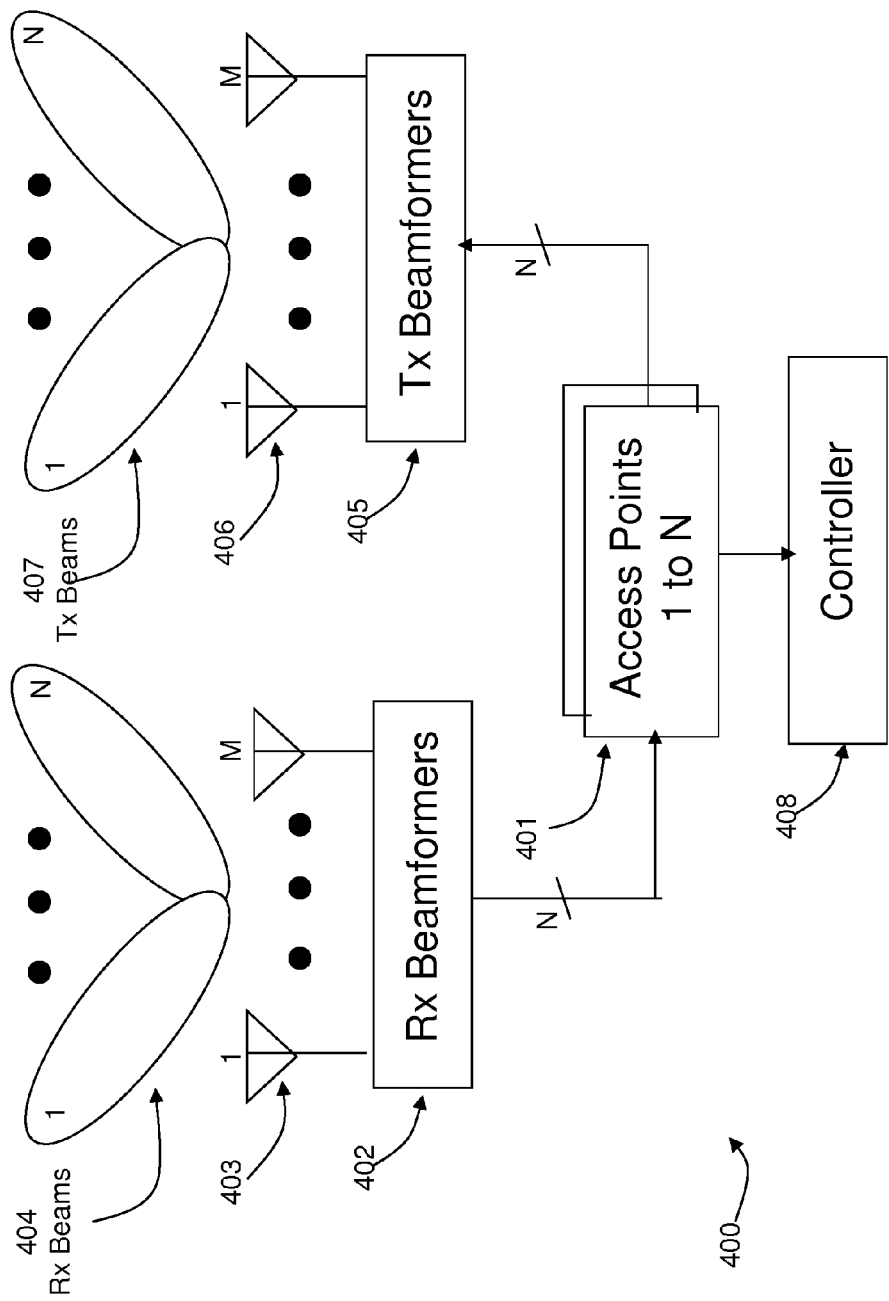
FIG. 4 is a schematic illustration of a multi-beam system with separated transmit and receive circuitry in accordance with an embodiment of the invention.

Reference is made to FIG. 4, which schematically illustrates a multi-beam system 400 with separated transmit and receive circuitry in accordance with an embodiment of the invention. The transmit circuitry may include a plurality of (N) APs 401 that generate transmit signals to a plurality of (N) transmit beamformers 405 which drive transmit antenna array 406 including a plurality of (M) antennas to create a plurality of (N) transmit beams 407. The receive circuitry operates in reverse and includes a receive antenna array 403 including a plurality of (M) antennas to receive a plurality of (N) of receive beams 404 and to be used in conjunction with a plurality of (N) receive beamformers 402 to create received signals for each individual AP 401. APs 401 may report received signal parameters to a controller 408. Embodiments of the invention may either be performed with analog beamformers or digital beamformers. In general, the number of beams (N) and APs (N) in each of the transmit or receive circuitry of system 400 is less than or equal to the number of antennas (M) in each of the transmit or receive antenna arrays 403 or 406 (N≤M).

Figure 5:
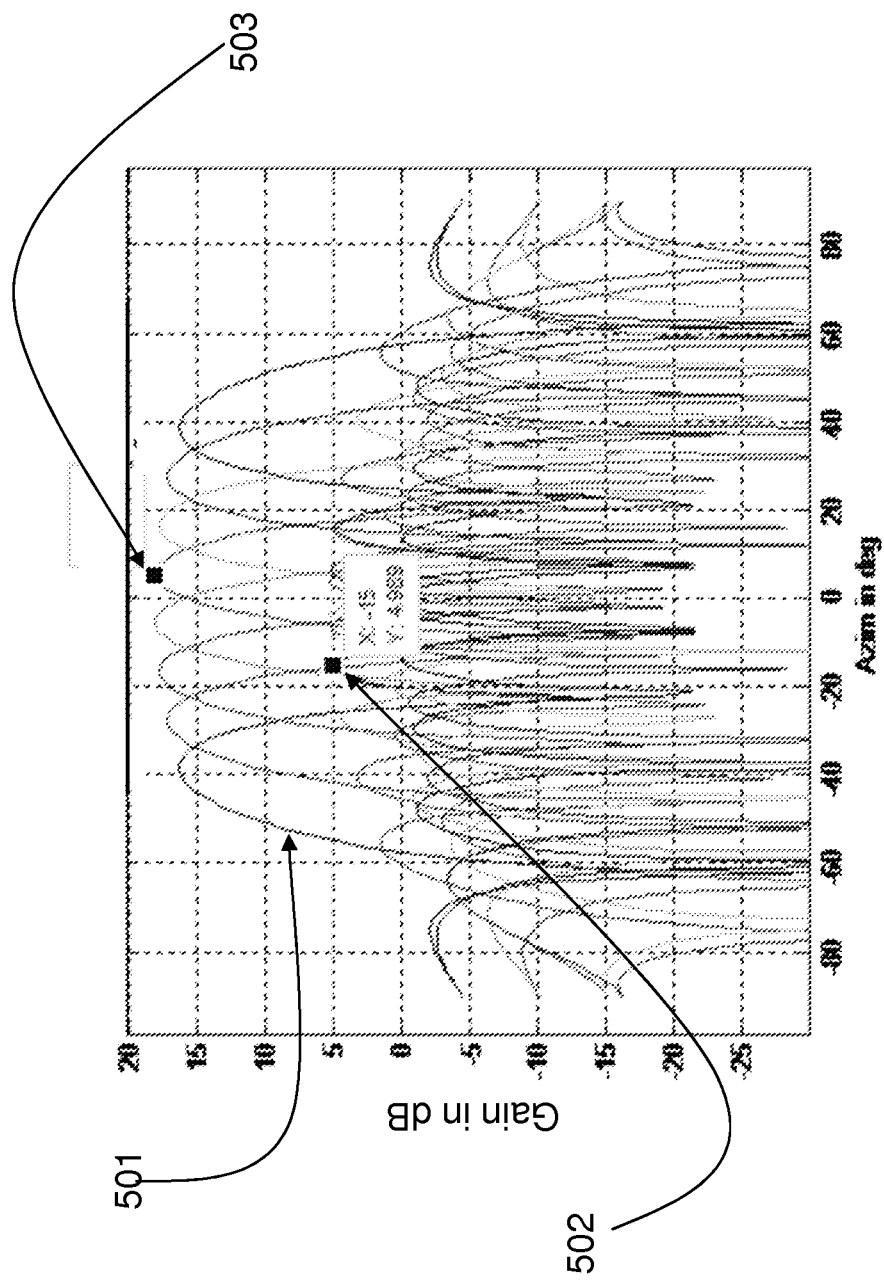
FIG. 5 is a schematic illustration of a radiation pattern of a multi-beam system in accordance with an embodiment of the invention.

Reference is made to FIG. 5, which schematically illustrates a radiation pattern of a multi-beam system including a plurality of (e.g., N=8) beams 501 transmitted by an antenna array including a plurality of (e.g., N=8) antenna elements in accordance with an embodiment of the invention. The antenna array may be coupled to a beamformer to generate the signals using beamforming (e.g., Butler matrix) techniques. Each of the (N) beams 501 may include a primary lobe 503 having a relatively higher gain or amplitude and sidelobes 502 having a relatively lower gain or amplitude. Primary lobe 503 of each beam 501 may be oriented in a different direction along a main axis of symmetry of the beam 501 (e.g. away from the emission plane of the antenna array) and sidelobes 502 of each beam 501 may be oriented in directions askew or surrounding the main axis of symmetry of the beam 501. To minimize interference, the ratio of the gain/amplitude of primary lobes 503 to the gain/amplitude of sidelobes 502 is preferably more than a threshold, for example, approximately 20 dB. In the example shown in FIG. 5, the ratio is approximately 13 dB, which may be below the threshold. Accordingly, a sidelobe suppression technique, such as, tapering or Taylor weighting, may be used to reduce the sidelobe interference of antenna arrays as shown in FIG. 6.

Figure 6:
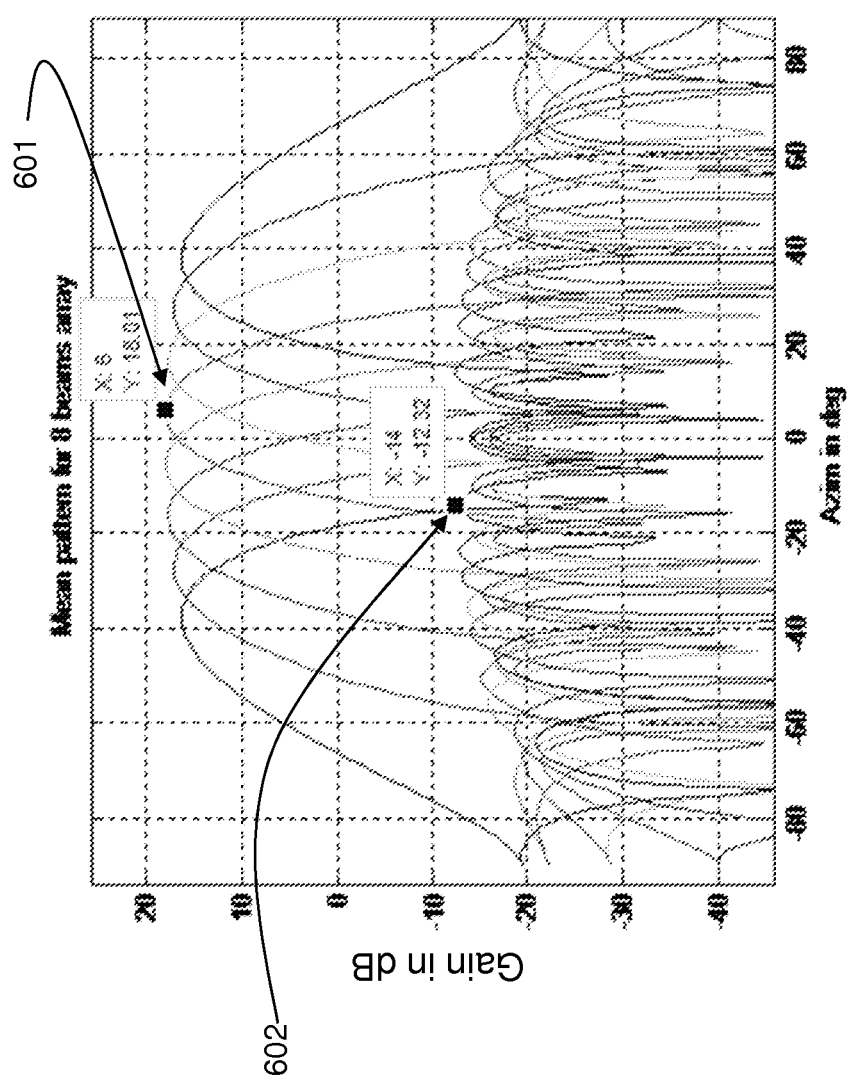
FIG. 6 is a schematic illustration of a radiation pattern of a multi-beam system as shown in FIG. 5 that is tapered in accordance with an embodiment of the invention.

Reference is made to FIG. 6, which schematically illustrates a radiation pattern of a multi-beam system as shown in FIG. 5 that is tapered, for example, using Taylor weighting, in accordance with an embodiment of the invention. The antenna array generates a plurality of (e.g., N=8) beams, each beam including a primary lobe 601 and sidelobe 602. In the example shown in FIG. 6, the ratio of primary lobe 601 to sidelobe 602 may be increased to approximately 30 dB. Although Taylor weighting may reduce sidelobe interference, effective tapering typically requires a substantially large antenna array. For example, an eight element linear antenna array is typically about 1.5 feet across for 2.4 GHz WiFi band coverage. This size may increase when using separate transmit/receive circuits as shown in FIG. 4. For example, an array with 3 feet of spacing between two 1.5 feet transmit/receive antenna arrays may result in a 6 foot antenna structure. Devices may become even more cumbersome when using digital beamformers e.g. as shown in FIG. 3. For example, a (N=8) beam system may use 16 radios, which may add complexity to calibrate those radios. Further, large tapered arrays may result in highly overlapped coverage of adjacent beams.

Figure 7:
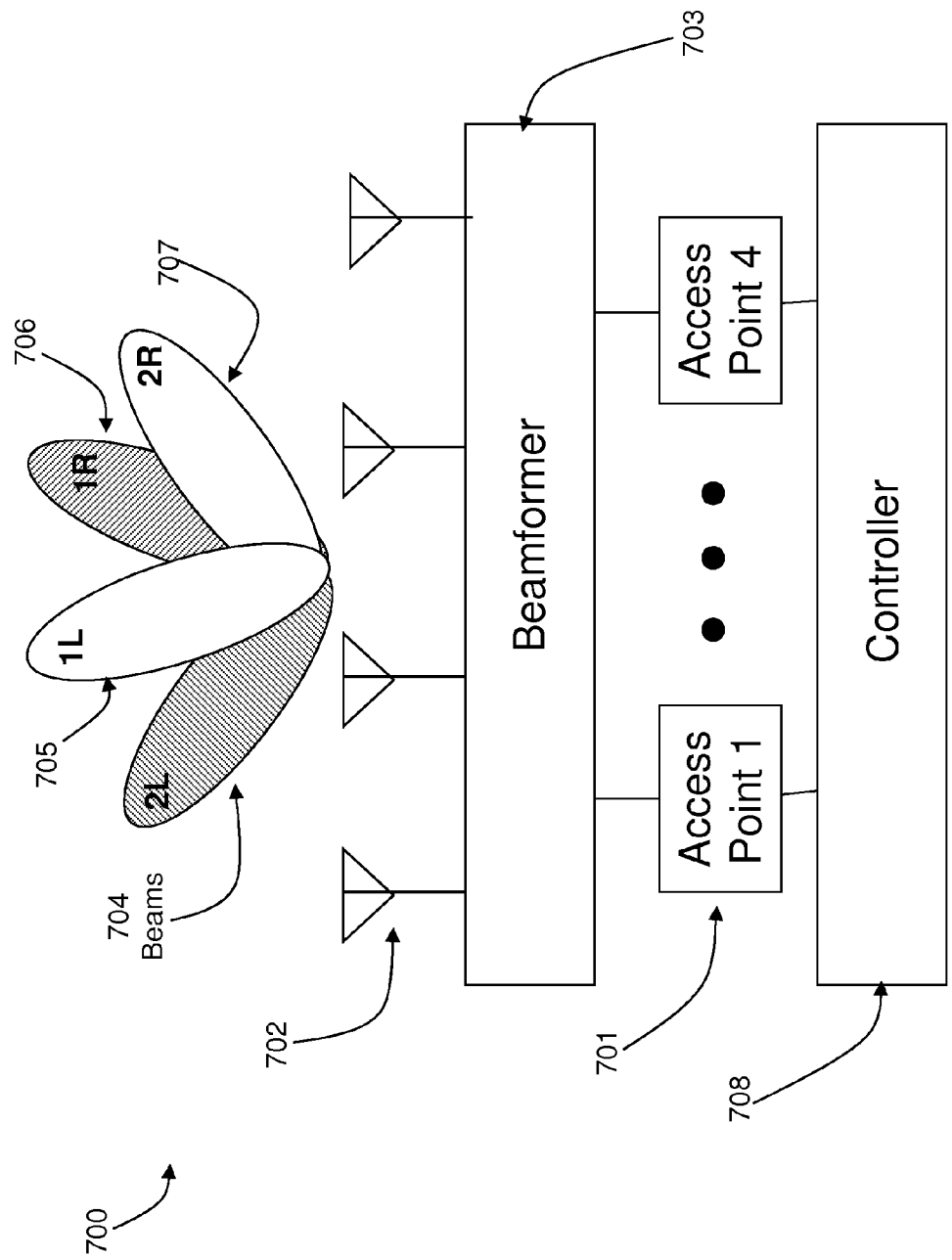
FIG. 7 is a schematic illustration of a multi-beam system for optimally registering UEs to APs in accordance with an embodiment of the invention.

Reference is made to FIG. 7, which schematically illustrates a multi-beam system 700 for optimally registering UEs to APs in accordance with an embodiment of the invention. Multi-beam system 700 may include a plurality of access points 701 driving one or more beamformers 703 and an antenna array 702 to create a plurality of beams 704-707 controlled by controller 708. Beamformer 703 may be analog or digital. Although FIG. 7 shows four access points 701, four antennas 702, and four beams 704-707, any number of such components greater than four (or greater than two) may be used. When using separate transmit/receive circuits as shown in FIG. 4, the circuitry configuration shown in FIG. 7 may be used for each of the transmitter circuitry and the receiver circuitry.

Adjacent beams 704-707 may overlap in coverage causing one beam (e.g. beam 705) to interfere with communications on adjacent beams (e.g. beams 704 and 706). To minimize interference near beam boundaries, adjacent beams may communicate over different frequency channels. In FIG. 7, beams 704 and 706 may be operated on one channel (indicated in the figure by shading) and beams 705 and 707 may be operated on a different channel (indicated in the figure by no shading) to provide frequency isolation between coverage areas. Although alternating channels across adjacent beams reduces interference, other sources of interference, in particular, sidelobe interference among the co-channel beams remains, as shown in FIG. 8.

Figure 8:
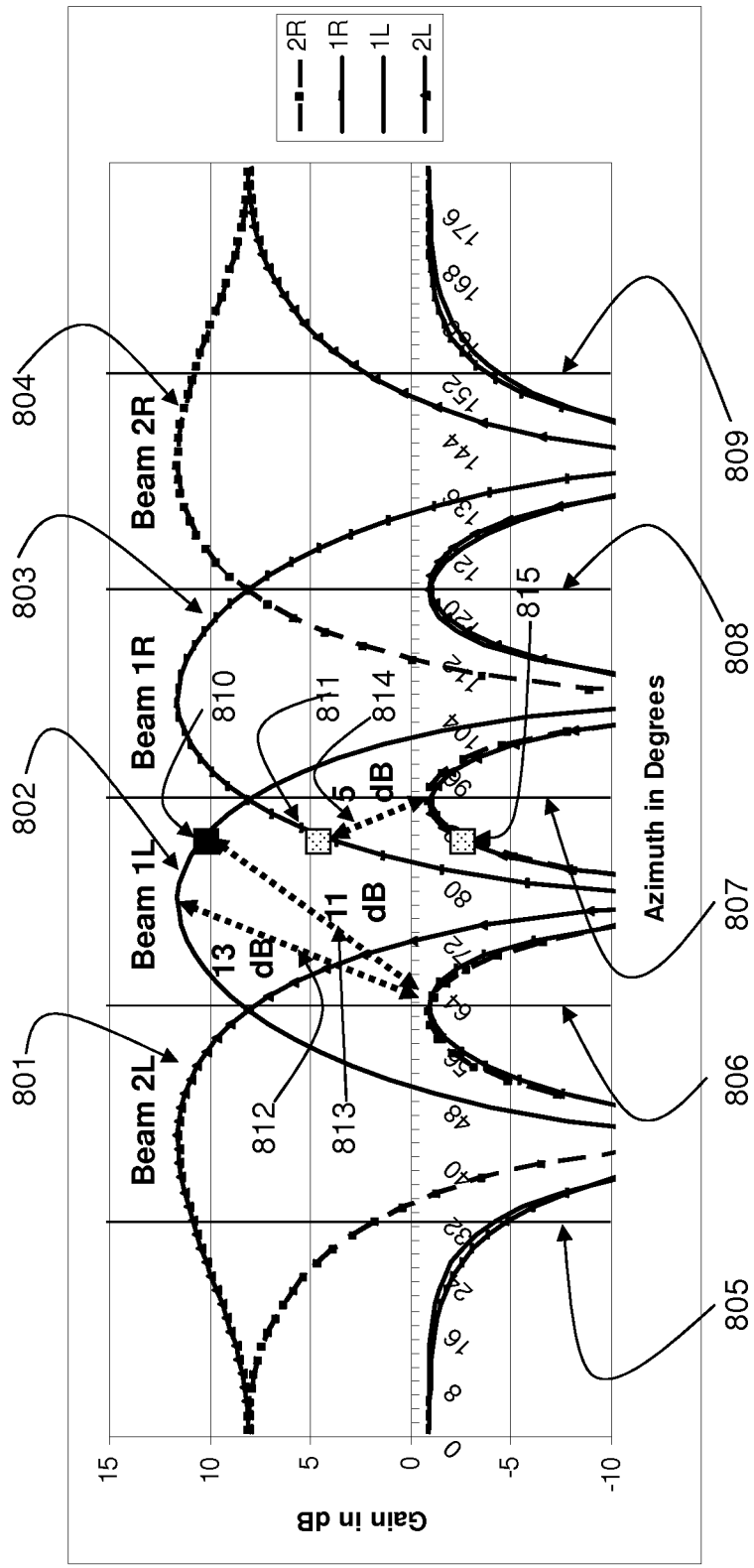
FIG. 8 is a schematic illustration of a radiation pattern for the antenna array of FIG. 7 in accordance with an embodiment of the invention.

Reference is made to FIG. 8, which schematically illustrates a radiation pattern for the antenna array of FIG. 7 in accordance with an embodiment of the invention. FIG. 8 shows the radiation gain/amplitude versus the azimuth of a signal transmitted by the antenna array of FIG. 7. In the example of FIG. 8, the radiation pattern is generated using a Butler beamformer with four isotropic radiators, although any other beamformer and/or radiator may be used. A four antenna four beam system is shown in the example of FIG. 8, although the figure and accompanying description may be generalized to a multi-beam system having any number of antenna elements and beams.

In FIG. 8, beams 801, 802, 803 and 804 are respectively identified as beams 2L, 1L, 1R and 2R to designate their positions to the left and right relative to the direction normal to the emission plane of the antenna array. The subsector coverage areas of beams 801-804 (e.g. each defining a range of azimuth values relative to the antenna radiation plane) are identified by lines 805-809 (e.g. each defining a single azimuth value) that represent the subsectors boundaries. Dashed line 812 shows that the gain/amplitude of each primary lobe is approximately 13 dB greater than the gains/amplitudes of sidelobes from other beams. The gain of each beam's primary lobe at its boundary with adjacent primary lobes is approximately 4 dB lower than the beam's maximum gain trace. Accordingly, the worst case of interference caused by a sidelobe may provide a gain ratio of approximately 9 dB in the example of FIG. 8. Since a UE typically scans multiple channels and registers with the first AP that accepts it, UEs located near overlapping beam boundaries may register with a sub-optimal AP in spite of the fact that the APs are operating on different channels.

A UE located along a single azimuth direction (e.g. 88° in FIG. 8) may register according to one of three possible outcomes by communicating with APs at one of three possible beam locations 810, 811 or 812. In the first outcome, the UE registers with an optimal AP associated with beam 1L 802 at beam location 810. In the second outcome, the UE registers with a sub-optimal AP associated with beam 1R 803 at beam location 811. In the third outcome, the UE registers with one of two sub-optimal APs associated with a sidelobe 807 of beam 2L 801 or beam 2R 804 at beam location 815. To identify the actual outcome, all APs may report to a controller (e.g., controller 408 of FIG. 4) the signal level from each UE communicating therewith, for example, together with a UE identifier such as a basic service set identifier (BSSID) (e.g. the media access control (MAC) address of the wireless access point (WAP) for each UE). If the UE has registered to a sub-optimal AP on an overlapping beam (e.g. at location 811) or on a sidelobe (e.g. at location 815), another optimal AP will report a stronger received signal (e.g. at location 810) than the level reported by the registered AP. The sub-optimal APs associated with overlapping beam 803 or with sidelobe 807 may reject the registration of the UE at beam location 811 or 815. In one embodiment, the rejected UE may subsequently be instructed to register with the optimal AP associated with beam 802 at beam location 810 (e.g. in accordance with IEEE 802.11k) or may be allowed to continue scanning the channels and register again, iteratively repeating the registration process, until it finds and registers with the optimal AP associated with beam 1L 802. The latter embodiment may be examined by comparing beam locations 810 and 811. Since beam location 810 shows a situation in which a UE registers to an AP over the primary lobe of beam 1L 802 providing a greater than threshold relative signal strength relative to the signal strength received over other beams 1R 803 of other APs on the same channel, the registration of the UE to the AP beam 1L 802 may be maintained. For example, when the UE is registered at beam location 810 of beam 1L 802, the AP associated with beam 1L 802 experiences a relatively higher gain/amplitude (and therefore a higher received signal level) of approximately 11 dB than the received signal by the sidelobe of co-channel beam 1R 803 as indicated by dashed line 813. However, beam location 811 shows a less desirable situation in which a UE registers to an AP over the primary lobe of adjacent beam 1R 803 providing a less than threshold relative signal strength relative to signals received over beam 2L 801 of the other co-channel AP. For example, when the UE is registered at beam location 811 of beam 1R 803, the AP associated with beam 1R 803 experiences approximately 6 dB lower gain or SNR indicated by dashed line 814 when its co-channel AP is operating on beam 2L 801. Accordingly, the registration of the UE to the AP associated with adjacent beam 1R 803 may be rejected.

In one embodiment, rejecting the registration of the UE to a sub-optimal AP may improve signal quality for the UE. In this example the UE may be roaming or located close to a boundary between beams. In conventional systems, as the UE moves closer and closer to the boundary and the signal worsens and worsens, the AP connection is maintained until the connection is so bad that it no longer meets the UE's registration standards. In contrast, according to embodiments of the invention, the AP may end or reject the registration when another non-registered AP provides a relatively higher signal strength than the currently registered AP, for example, before the signal quality degrades to levels below registration standards. Accordingly, the signal strength of the communication between the UE and the registered AP may be reassigned to a better AP in spite of being above the minimum signal strength allowed by the UE's registration standards for being rejected, thereby improving system communication.

According to an embodiment of the invention, a system and method of communicating in a wireless multi-beam network is provided for optimizing signal reception quality in a communication channel between an AP and a UE. Embodiments of the invention may enable the UE to selectively register with an AP when the ratio of the power level of said channel beam to the power level of another (suboptimal) channel or beam, such as a sidelobe of a co-channel beam, satisfies a predefined threshold. A plurality of APs may receive, measure and report to a controller, their respective power levels received from the same UE. The controller may determine if the UE ratio of received signal power levels is within a predefined threshold range. The controller may select an optimal communication channel for the UE based on said threshold determination. The controller may use the predefined threshold of the signal power ratios to select between the signal presented in a desired channel over that of an undesirable channel, as may be present in a sidelobe channel. The controller may determine if the predefined threshold is further defined to be approximately, for example, 6 dB. Other measurements of signal strength ratios may be used.

According to embodiments of the invention, when a UE registers to a system and is detected by only one AP, no re-registration takes place. If the UE is detected by two or more APs (e.g. two in the case of a 4-beam system), the controller may determine if the UE is registered to an optimal or suboptimal beam/channel/AP based on the relative ratio of signal strengths recorded by each AP. If the UE is registered with an AP on a stronger signal, for example, where the ratio of signal strength of the stronger signal to a weaker signal with another AP is greater than a predetermined threshold (e.g., >6 dB), the controller may determine that the UE is registered with the optimal beam/channel/AP and no re-registration takes place. If the UE is registered with an AP on another signal, for example, where the ratio of signal strength of the stronger signal to a weaker signal with another AP is less than a predetermined threshold (e.g., <6 dB), the controller may determine that the UE is registered with a suboptimal beam/channel/AP and may assign the UE to re-register with the AP associated with the stronger signal or another AP. Further, if the UE is registered but the ratio of received signal levels is less than the threshold, the controller may determine that neither beam/AP is ideal, and that another beam/AP may be ideal, which cannot be detected because the UE is registered on a different channel (frequency) than the ideal beam/AP. Accordingly, the AP may reject the sub-threshold registration and re-register either by requiring the UE to re-scan channels to repeat the above steps or may be directly assigned to a new AP (e.g., when using the IEEE 802.11k protocol) and verify the assignment is to the optimal AP/beam by repeating the above steps.

According to some embodiments, in order to support the maximum capability offered by WiFi, 64-quadrature amplitude modulation (QAM) may be used. Systems using 64-QAM typically require at least a −20 dB signal to interference (sidelobe) ratio in order to achieve acceptable performance. As described above, antenna element tapering (e.g., Taylor weighting) may reduce sidelobe interference when the antenna arrays are large (e.g., eight antenna elements or more). A disadvantage of tapering however is it reduces antenna array efficiency thereby lowering the achievable gain. For this reason, systems typically use tapering, which may be insufficient to effectively suppress sidelobe interferences to desired levels. Accordingly, embodiments of the invention may provide a combination of tapering and a signal cancellation technique to reduce sidelobe interference.

Figure 9:
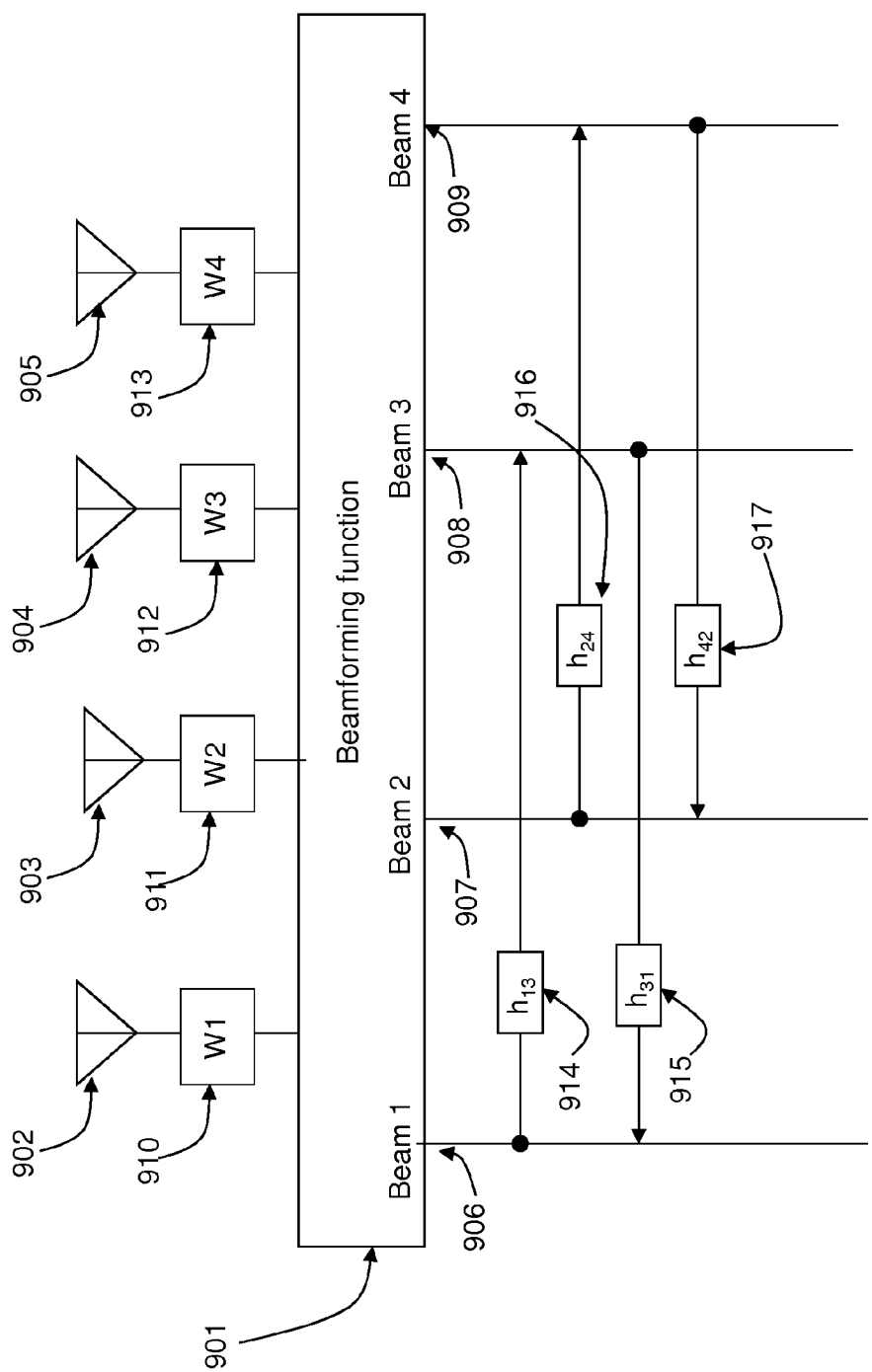
FIG. 9 is a schematic illustration of a multi-beam system for tapering and signal cancellation in accordance with an embodiment of the invention.

Reference is made to FIG. 9, which schematically illustrates a multi-beam system for tapering and signal cancellation in accordance with an embodiment of the invention. FIG. 9 may include one or more beamforming functions 901 to taper signals to/from a plurality of antennas 902-905 with weights $w_1$, $w_2$, $w_3$ and $w_4$ 910-913 to transmit/receive a plurality of tapered beams 906-909, respectively. In addition, beamforming function 901 may use coupling coefficients $h_{13}$, $h_{31}$, $h_{24}$ and $h_{42}$, 914-917 (e.g. complex weighting functions having real and/or imaginary parts) to couple beams 908, 906, 909, and 907, respectively, for signal cancellation. For example, one beam may be coupled to another beam on the same channel, e.g. $h_{13}$ is used to couple beam 906 with beam 908 and $h_{24}$ is used to coupling beam 907 with beam 909, for example, to cancel, suppress or reduce the level or strength of the undesired signal being received or transmitted in the sidelobe direction.

Figure 10:
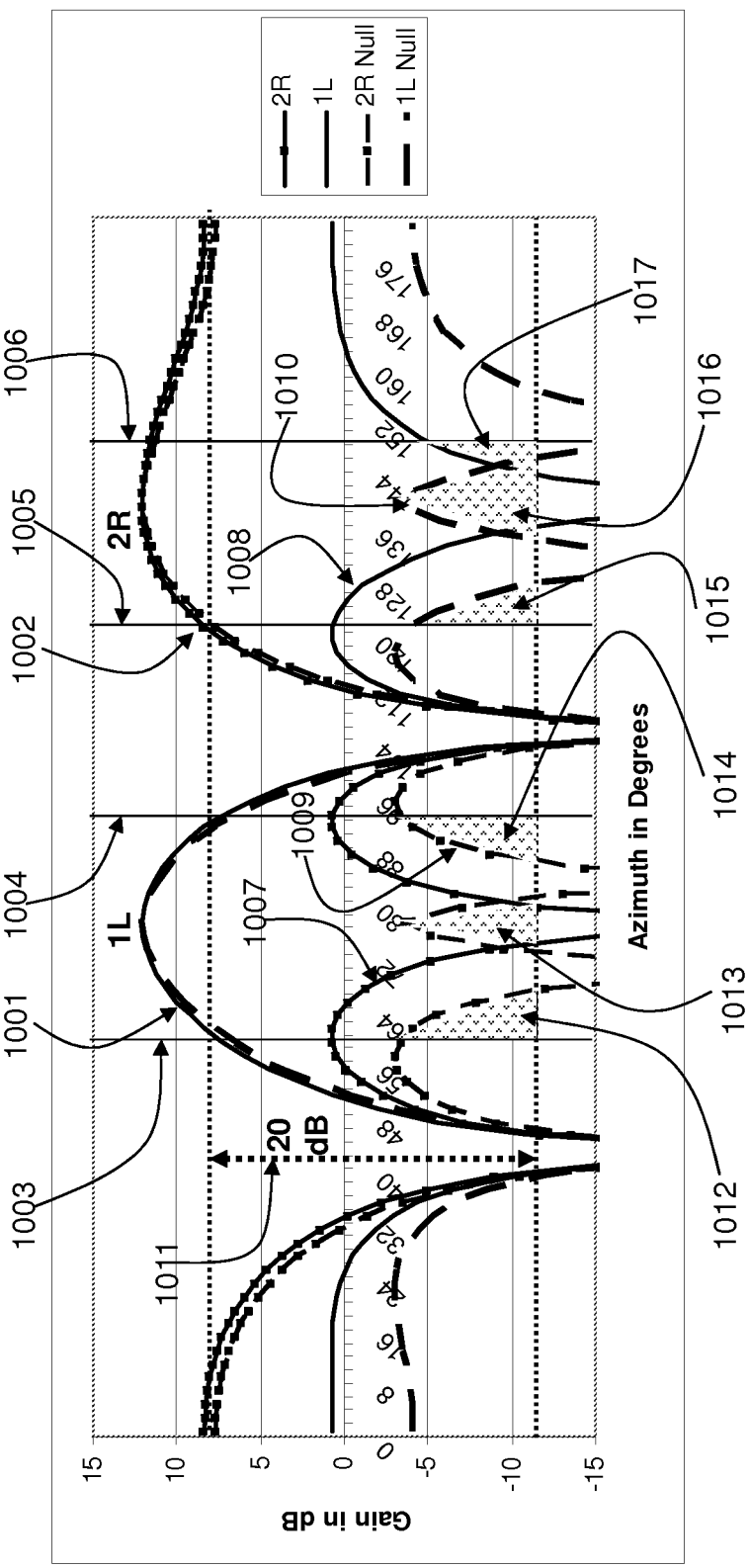
FIG. 10 is a schematic illustration of a radiation pattern transmitted by the antenna array of FIG. 9 with and without signal cancellation in accordance with an embodiment of the invention.

Reference is made to FIG. 10, which schematically illustrates a radiation pattern transmitted by the antenna array of FIG. 9 with and without signal cancellation in accordance with an embodiment of the invention. FIG. 10 shows the radiation gain versus the azimuth of the signal without signal suppression (solid lines) and with tapering and signal cancellation (dashed lines). For clarity, only two co-channel beams are shown, for example, beam 1L 1001 and beam 2R 1002, although a similar radiation pattern exists for the beams 1R and 2L on the other channel. Lines 1003-1006 identify the subsector boundaries for the two beams 1001 and 1002.

FIG. 10 shows the level of the sidelobes from one beam in the direction of the other. Trace 1007 identifies the level of beam 2R 1002 in the direction of beam 1L 1001 and trace 1008 identifies the level of the sidelobes of beam 1L 1001 in the direction of beam 2R 1002, all without signal cancellation. Similarly, trace 1009 identifies the level of beam 2R 1002 in the direction of beam 1L 1001 and trace 1010 identifies the level of the sidelobes of beam 1L 1001 in the direction of beam 2R 1002, all with signal cancellation. Line 1011 shows the threshold level required for a worst case of sidelobe interference of e.g. −20 dB from the lowest beam gain within the subsector. Shaded areas 1012-1017 define directions that do not meet that criterion.

Figure 11:
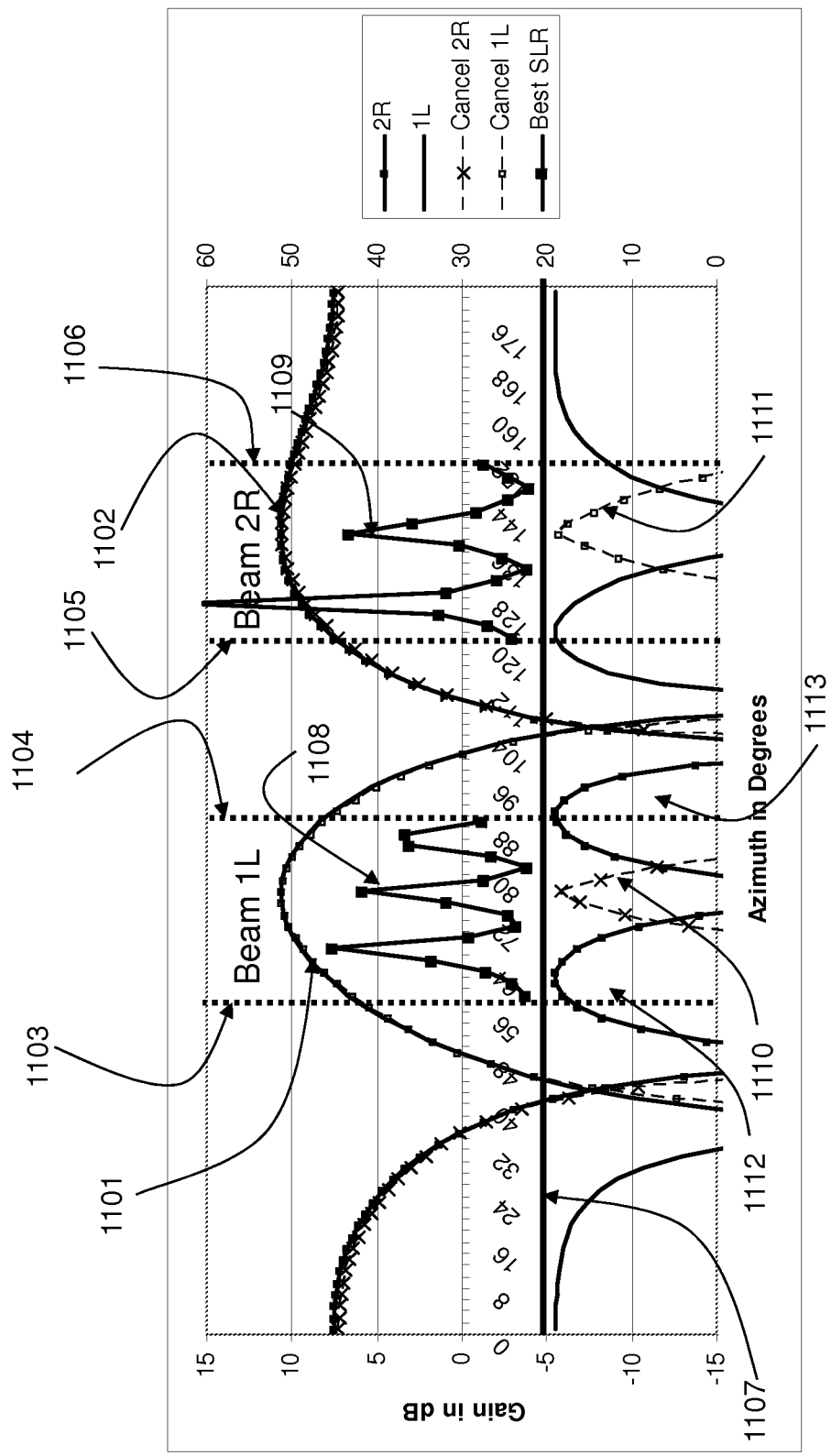
FIG. 11 is a schematic illustration of a radiation pattern transmitted by the antenna array of FIG. 9 with tapering and selective signal cancellation in accordance with an embodiment of the invention.

Reference is made to FIG. 11, which schematically illustrates a radiation pattern transmitted by the antenna array of FIG. 9 with tapering and selective signal cancellation in accordance with an embodiment of the invention. The radiation plots of FIG. 11 show the gains or amplitudes of the same co-channel beams 1L 1101 and 2R 1102 after tapering of the elements has been applied. In the example shown in FIG. 11, tapering weights W1-W4 (e.g. 910-913 of FIG. 9) are 0.7, 1.0, 1.0 and 0.7, respectively. A comparison of the radiation patterns FIG. 10 (without tapering) and FIG. 11 (with tapering) shows that after tapering the primary lobe beam to sidelobe ratio is approximately 16 dB in FIG. 11 compared to the non-tapered ratio of approximately 13 dB in FIG. 10, which has little or no tapering, and at the subsector boundaries, after tapering the ratio is approximately 13 dB in FIG. 11 compared to the non-tapered ratio of approximately 9 dB in FIG. 10. Traces 1110 and 1111 correspond to the signal cancellation achieved by a beamformer applying coupling coefficients $h_{24}$ and $h_{42}$ (e.g. 916 and 917 of FIG. 9) to Beam 1 and 2 (e.g. 909 and 907 of FIG. 9), respectively. Traces 1110 and 1111 show that, although the combination of tapering and signal cancellation may increase the primary lobe to sidelobe ratio, the ratio is still less than the 20 dB threshold used to support 64-QAM. Accordingly, additional measures may be used to achieve the 20 dB threshold ratio. One such measure is selective signal cancellation.

FIG. 10 shows that in the direction of beam 1L 1001, signal cancellation or coupling may reduce the strength of sidelobe signals of co-channel beam 2R from 1007 to 1009 near the boundaries 1003 and 1004 of the 1L subsector. However, near the center of the subsector (e.g. an azimuth range of approximately 75-85°), signal cancellation or coupling adds an interference artifact 1013 for beam 1L 1001 and 1016 for beam 2R 1002 in FIGS. 10 and 1110 and 1111 in FIG. 11. Thus, signal cancellation may improve the primary lobe to sidelobe ratio near subsector boundaries (in the sidelobe directions), but may worsen the ratio near the subsector center (in the primary lobe direction) where there are typically no significant sidelobes. The benefit of signal cancellation may therefore depend on the location of a UE in the subsector. Accordingly, embodiments of the invention may selectively activate signal cancellation based on the UE location. When the UE is near the subsector boundaries and sidelobe interference is above a threshold ratio, beamformer may apply signal cancellation. However, when the UE is near the subsector center and sidelobe interference is below a threshold ratio, beamformer may not apply signal cancellation. To determine the level of sidelobe interference and thus the location of the UE, embodiments of the invention may conduct a signal cancellation test, turning signal cancellation on and then off, to determine whether or not interference is reduced or increased by the signal cancellation. If interference is reduced, signal cancellation may be turned on for continued communication with the UE, while if interference is increased, signal cancellation may be turned off.

Figure 12:
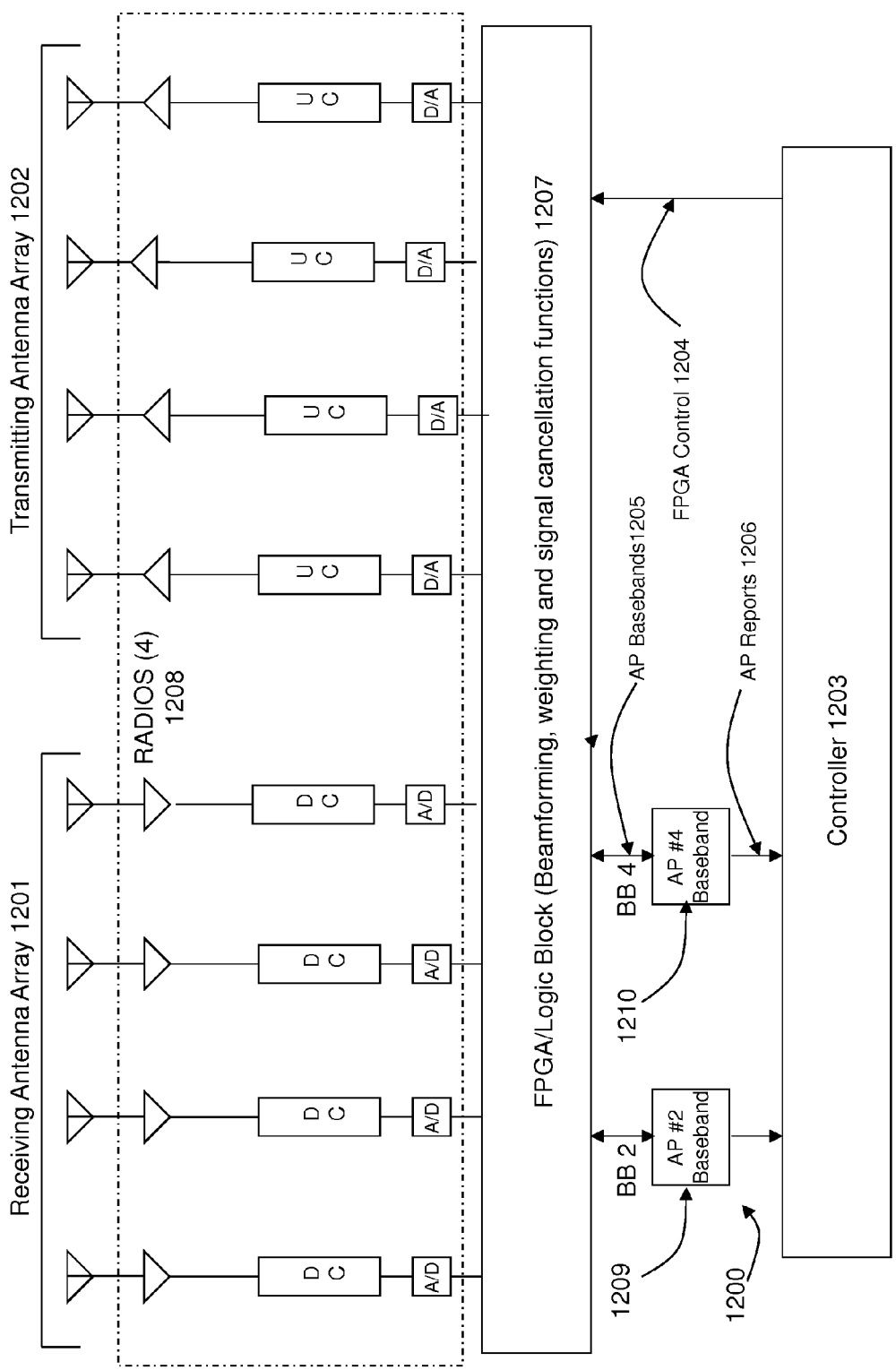
FIG. 12 is a schematic illustration of a multi-beam system for selective signal cancellation using digital beamforming in accordance with an embodiment of the invention.

Reference is made to FIG. 12, which schematically illustrates a multi-beam system 1200 for selective signal cancellation using digital beamforming in accordance with an embodiment of the invention. A UE signal may be received by two or more APs, for example, over beam 1L 1101 and beam 2R 1102 of FIG. 11, where one is received on a sidelobe. In one example configuration, the signal received over beam 1L 1101 is stronger than that received over beam 2R 1102, although a corresponding technique applies if the beam 2R 1102 signal is stronger than that the beam 1L 1101 signal. System 100 may provide a test to determine if signal cancellation is effective or not. In one step, signal cancellation may be turned off and the beamformer may not activate a coupling coefficient $h_{24}$ 916 of FIG. 9. When signal cancellation is off, a radiation pattern may reveal the sidelobe patterns 1112 and 1113 of beam 2R 1102 shown in FIG. 11 in which a UE is not in the direction of the center of the beam 1L 1101 (e.g. an azimuth range of 75-85°) but in a location either to the right of the beam center at 1113 (e.g. an azimuth range of 60-75°) or to the left of the beam center at sidelobe 1112 (e.g. an azimuth range of 85-90°) because the sidelobe level in the direction of the center of beam 1L 1101 is nearly null (zero). In another step, coupling may be turned on and the beamformer may activate the coupling coefficient $h_{24}$ 916 of FIG. 9. When signal cancellation is on, a radiation pattern may reveal a UE located in the direction of the center of beam 1L 1101 because the signal cancellation pattern of trace 1110 of FIG. 11 shows that the sidelobe level of beam 2R 1102 is high in the direction of the center of beam 1L 1101 and not off center.

According to one embodiment of the invention, each AP may use the two on/off signal cancellation modes to test whether or not to activate signal cancellation by measuring and recording the better performing mode (e.g. whether interference was lower with coupling coefficient $h_{24}$ 916 on or off). Each AP may identify which signals are from each UE by the signal's UE identification code (e.g., MAC address). Subsequently after an AP (e.g. AP #2 1209 assigned to beam 1L of FIG. 12) receives signals from a UE in both on and off modes and identifies the preferred mode, the AP informs the controller (e.g. controller 1203 of FIG. 12) of the preferred mode (e.g. turn coupling coefficient $h_{24}$ 916 of FIG. 9 on or off) that produces the best performance when receiving UE signals (e.g. with beam 2R 1102 of FIG. 11). If neither mode with coupling coefficient $h_{24}$ 916 on or off reduces the UE signal received by two beams/APs, the UE may be too close to the antenna array(s). In such cases, the UE may be assigned to communicate with an alternate AP/channel using an antenna that covers the whole sector.

In another embodiment, once the aforementioned UE has been identified, the controller 1203 may command the logical block element 1207 to perform real time cancellation or suppression of the specific UE signal component received in beam 2R 1102 from that UE based on filtering and cancelling using finite impulse response (FIR) and correlation techniques, and the stronger signal received in beam 1L 1101.

Embodiments of the invention may reduce interference from the sidelobes of beam 2R 1102 for UEs located in the direction of beam 1L 1101, which may reduce the UE signal strength received at the AP #4 1210 assigned to beam 2R 1102. Such embodiments may similarly apply to the alternate beam by substituting $h_{42}$ 917 for $h_{24}$ 916, beam 2R 1102 for 1L 1101 and beam 1L 1101 for beam 2R 1102 to reduce interference from the sidelobes of beam 1L 1101 for UEs located in the direction of beam 2R 1102, which may reduce the UE signal strength received at the AP #2 1209 assigned to beam 1L 1101.

According to an embodiment of the invention, a system and method is provided for using a controller to select an optimal channel and/or beam in a wireless network. Entry of a UE may be detected in a sector that contains a plurality of beams for communicating with a plurality of access points. A suboptimal UE registration may be determined within an AP's beam subsector. A more optimal reception channel may be selected using a predefined algorithm directed to the slope of a selected beam. An optimal communication channel may be selected by comparing the offered signal quality available to a UE by using said controller to assess the effect of selectively applying signal cancellation methods to/at the access points. An optimal communication channel may be selected when in the presence of both a desired beam and a sidelobe beam. The impact of applying signal cancellation methods may be determined by selectively activating and deactivating beam to beam signal coupling or signal cancellation using coupling coefficients, for example, $h_{13}$, $h_{31}$, $h_{24}$ and $h_{42}$.

Traces 1110 and 1111 of FIG. 11 show that when applying signal cancellation according to embodiments of the invention, the sidelobe ratio is rarely worse than −20 dB and has a worse case of −17 dB for only a small percentage of directions. According to an alternative embodiment of the invention, signal cancellation may be applied continuously to sufficiently reduce the sidelobe ratio to below threshold (e.g. −20 dB) in most cases, leaving a small percentage of cases in which the sidelobe ratio is above threshold. However, this −20 dB threshold may be required for only some types of modulation (e.g. 64-QAM). Accordingly, in one embodiment, some UEs located in below threshold directions may communicate with less efficient modulation. In another embodiment, APs may detect and record the modulation used by each UE, and may apply selective signal cancellation for modulations requiring a relatively higher range of the sidelobe rejection ratios (e.g. 64-QAM requiring greater than a 20 dB ratio) and apply continuous signal cancellation for modulations requiring a lower range of the sidelobe ratios (e.g. 16-QAM requiring greater than approximately a 14 dB ratio).

According to an embodiment of the invention, a system and method is provided for operating a controller in a wireless network. Embodiments of the invention may include detecting the entry of a UE in a sector containing a plurality of beam spaces offered by a plurality of access points. Signal cancellation may be continuously, indiscriminately or non-selectively applied to all signals, for example, upon detecting a received signal cancellation indicator from said controller identifying the presence of a sidelobe channel. Embodiments of the invention may include allocating any UE with a less that optimal signal power to an alternate access point. Embodiments of the invention may include detecting the modulation of each UE and may apply selective signal cancellation only to UEs operating in 64 QAM mode and continuous signal cancellation to UEs operating in all other modulations, for example, allowing higher sidelobe interference.

The signal strength information gathered and recorded from each UE during reception periods by an AP may be used to reduce interference during transmission periods. Referring to FIGS. 11 and 12, when AP #4 1210 associated with beam 2R 1102 transmits signals, the signal radiation from sidelobes 1112 and 1113 may cause interference with transmissions by AP #2 1209 to UEs in the subsector covered by beam 1L 1101. When an AP is transmitting on beam 2R with AP #4, and AP #2 is attempting to communicate to a UE in its subsector using beam 1L, the system may use the information previously measured and recorded that estimated the advantage or disadvantage of coupling for the UE to instruct the logical block element whether or not to apply signal suppression or cancelling. For example, if during a reception period, an AP determines that when receiving signals from the UE on beam 1L signal cancellation using coupling coefficients $h_{24}$ 916 substantially suppressed reception on that beam by AP #4, the coupling signal $h_{42}$ 917 may be used for the transmission to prevent transmissions of beam 2R from interfering with transmissions to that UE on beam 1L. As the system prepares to send data to a specific UE, the controller checks its stored profile on that specific UE, determining various parameters for that UE including the negotiated data rate. As part of that decision logic, the system controller may determine if applying signal cancellation is appropriate and, if so, instructs the logical block element of the upcoming transmission and duration of the transmission, for example, as indicated in a network allocation vector (NAV) counter. The system controller may then create a datagram or other communication unit to send to the UE as soon as other conditions such as clear channel assessment (CCA) are satisfied. The system controller may create signal cancellation information in advance of actually transmitting the datagram. The optimal time for the logical block element to implement signal cancellation, or not, may be coincident with or simultaneous to the transmission of the signal. This optimum time may be achieved by the AP generating a timing strobe coincident with the data transmission. The logical block element may initiate signal cancellation, or not, coincident with this timing strobe, for example, for the duration of the NAV value. A near optimal timing by the logical block element may occur if the logical block element cancels or does not cancel the signal within several microseconds (μsec) of the actual transmission by the UE. There is typically no significant degradation of the signal if the signal cancellation is early. If the signal cancellation is late, a signal preamble may experience a reduced signal-to-interference-plus-noise ratio (SINR). However, since the preamble is typically sent at a much lower modulation rate, the impact may be negligible. Further, data frames transmitted/received in the signals may include forward error correction (FEC) bits, which may be used to correct any errors caused by delayed signal cancellation to prevent retransmission.

According to an embodiment of the invention, a system and method is provided for optimizing reception quality in a wireless network between an access point and a user equipment apparatus. Embodiments of the invention may include detecting entry of a user equipment in a sector covered by a plurality of beams provided by a plurality of access points, measuring and determining the effect of applying signal cancellation methods for said user equipment, reporting to the controller the specific identifiers of said user equipment prior to transmission, allowing the controller to select an optimal signal cancellation function or coupling coefficients hij to apply during receive intervals as a function of the received signal over each beam i to the received signal over each beam j, and applying signal cancellation during transmit intervals as an inverse or transpose of coupling coefficients hji when transmitting over both beams i and j. The coupling coefficients $h_{ji}$ for signal cancellation may be applied coincident with the transmission over beams and j. Embodiments of the invention may include continually applying said method to all user equipment. Embodiments of the invention may include allocating any user equipment with less that optimal signal power to an alternate access points. Embodiments of the invention may include detecting a user equipment operating in 64 QAM mode, applying selective signal cancellation methods only to those user equipment operating in 64 QAM mode.

Figure 13:
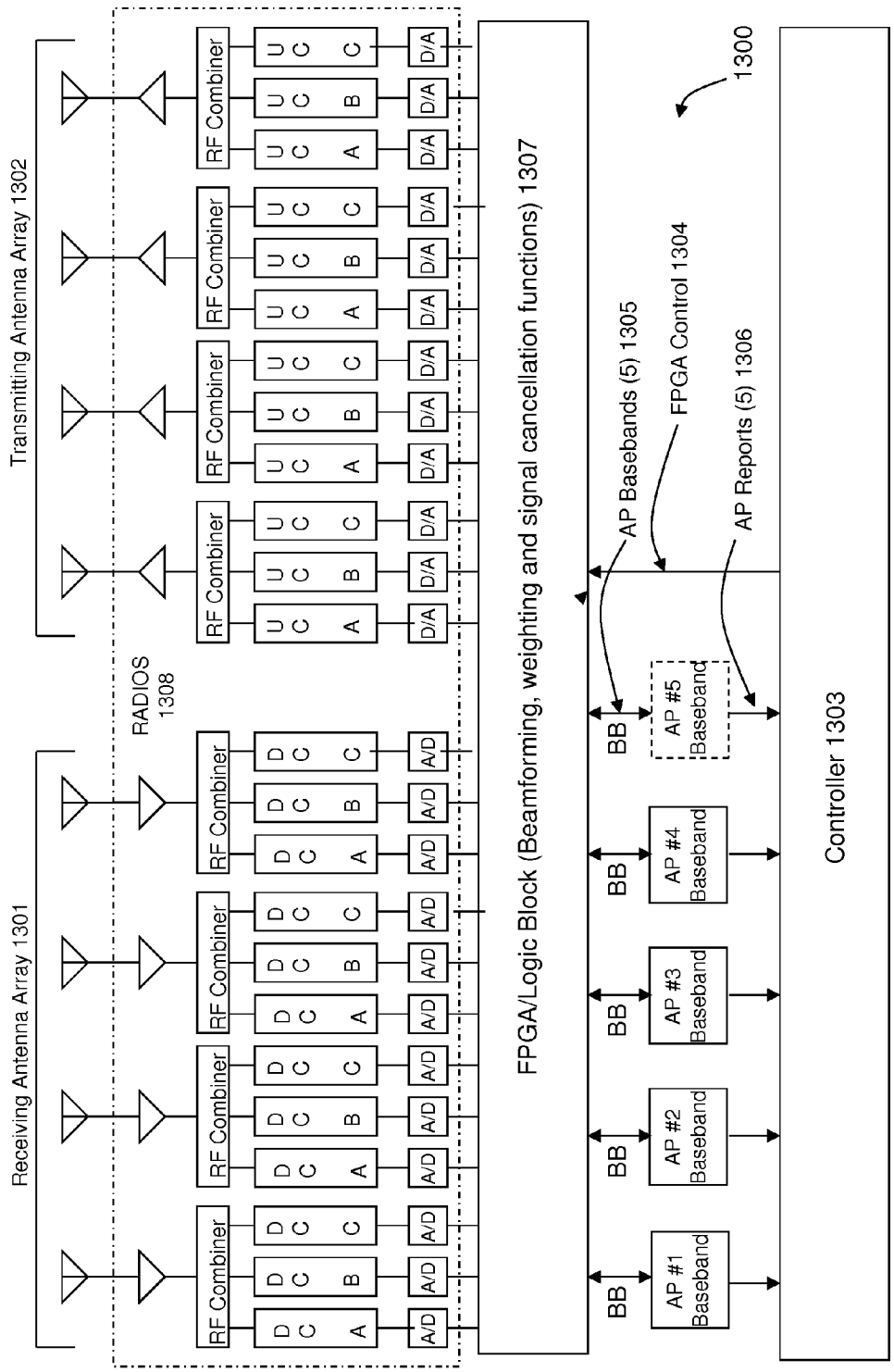
FIG. 13 is a schematic illustration of a multi-beam system for selective signal cancellation using digital beamforming in accordance with an embodiment of the invention.

Reference is made to FIG. 13, which schematically illustrates a multi-beam system 1300 for selective signal cancellation using digital beamforming in accordance with an embodiment of the invention. System 1300 may include separate receive and transmit antenna arrays 1301 and 1302 as described in reference to FIG. 4. System 1300 may include a plurality of radios 1308 to process RF signals at antenna arrays 1301 and 1302. Radios 1308 may include a plurality of upconverters (UC) A, B and C and downconverters (DC) A, B and C to support a plurality of (e.g. N=3) channels. "UC A" and "DC A" may provide communication over one channel A assigned to two or more access points (e.g., AP #1 and AP #3). "UC B" and "DC B" may provide communication over another channel B assigned to two or more other access points (e.g., AP #2 and AP #4). The plurality of APs (e.g. AP #1-AP #4) may generate a multi-beam system subdividing an area of coverage (e.g. area 225 of FIG. 2) into a plurality of subsector zones or beams over which the APs may independently communicate with UEs. Adjacent beams may operate over alternating channels A and B to minimize interference at zones boundaries, as described in reference to FIG. 7. According to an embodiment of the invention, an additional access point (e.g., AP #5) may provide a sector beam spanning across the entire area (or at least across multiple subsector zones). The additional access point may operate on an independent channel C different from channels A and B, for example, to avoid interference with overlapping beams associated with other APs 1-4. In the example shown in FIG. 13, a logical block element such as the FPGA 1307 may connect the signals from all antenna elements in arrays 1301 and 1302 with UC C and DC C to form the sector beam. In another embodiment, only one of the antenna elements (e.g. an outer-most element) may be used to form the sector beam, which may be operated at reduced power case because of tapering for the other channels A and B.

Figure 14:
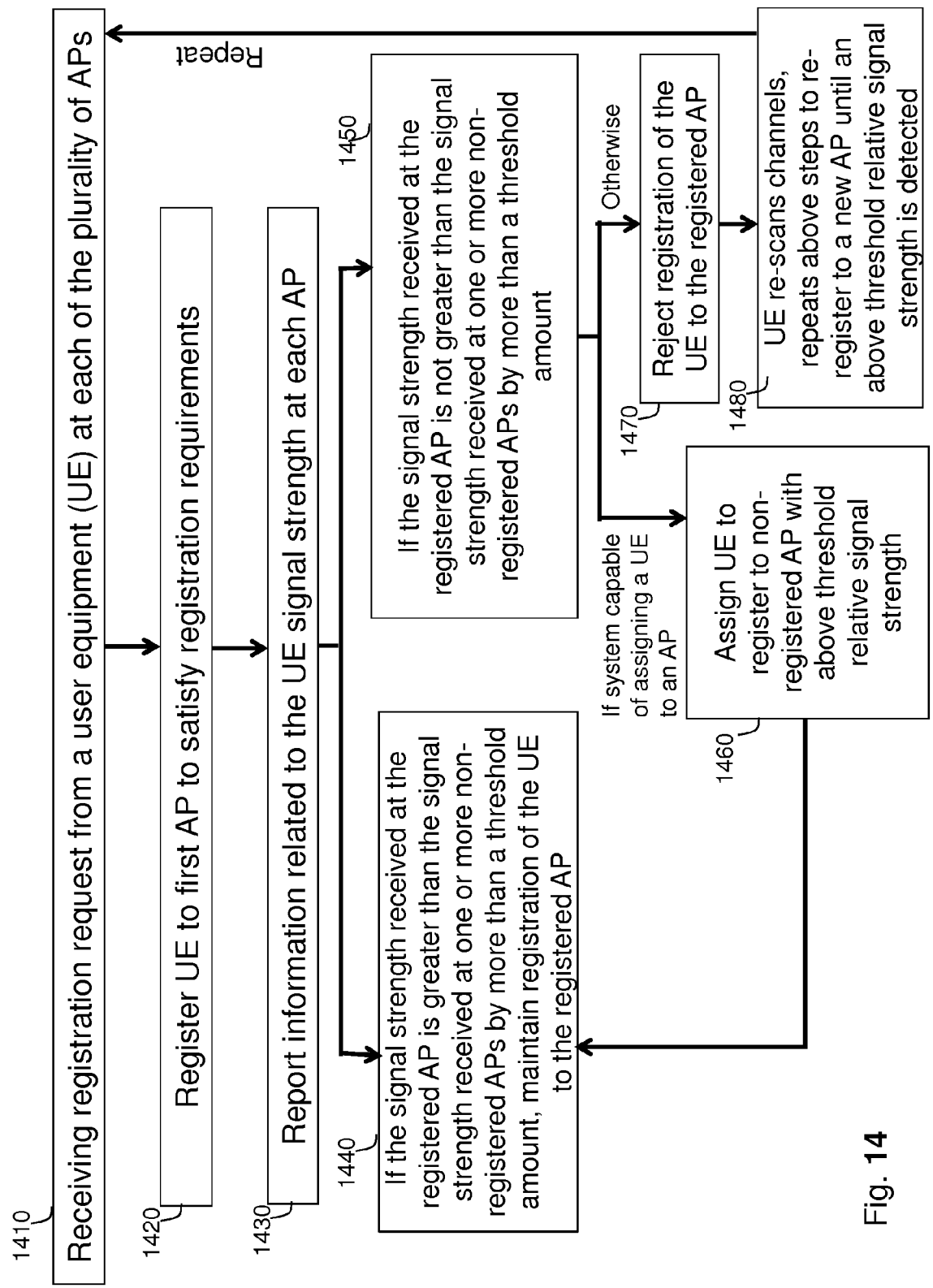
FIGS. 14-15 are flowcharts of methods in accordance with embodiments of the invention.

Reference is made to FIG. 14, which is a flowchart of a method in accordance with an embodiment of the invention. Operations described in reference to FIG. 14 may be executed using one or more processor(s) disposed in devices shown in FIGS. 7, 9, 12 and/or 13, such as, controllers 408, 708, 1203 and/or 1303 and/or APs 401, 701, 1209/1210 and/or AP#1-5 of FIG. 13.

In operation 1410, a processor may receive an indication that each of a plurality of APs have each received a signal or transmission from the same user equipment (UE) over the same channel. The UE reception is with each AP over an associated beam. The UE may communicate with an optimal AP over a primary lobe providing relatively higher signal strength or suboptimal APs over one or more surrounding sidelobes providing relatively lower signal strength. The AP may identify a signal from the UE by receiving an associated UE identifier such as a BSSID in the signal.

In operation 1420, a processor may determine that the first one of the plurality of APs to satisfy registration requirements associated with the UE may register the UE. The first registered AP may be an optimal or suboptimal AP.

In operation 1430, each AP may report to the processor information related to the signal strength of communication received at the AP from the UE. Depending on the relative signal strengths received at each AP, a process or processor may proceed to operation 1440 or 1450.

In operation 1440, if the controller determines that the signal strength received at the registered AP is greater than the signal strength received at one or more of the non-registered APs by more than a threshold amount, the processor may maintain the registration between the UE and AP in operation 1420. The registered AP may receive such an above threshold relative signal strength when the UE communicates with the registered AP over a primary lobe.

In operation 1450, if the controller determines that the signal strength received at the registered AP is not greater than (e.g. less than or equal to) the signal strength received at one or more of the non-registered APs by a threshold amount, the processor may reject the registration between the UE and AP in operation 1420. The non-registered AP may receive such a signal strength when the UE communicates with the non-registered AP over a primary lobe and the registered AP over a sidelobe.

A process or processor may proceed to operation 1460 if the UE is capable of being directed to a specific AP, for example, operating according to the IEEE 802.11k protocol. For such a UE, a processor may direct the UE to re-register or associate with a non-registered AP that receives signals from the UE having a signal strength that is greater than the signal strength received at the registered APs by more than a threshold amount. Accordingly, the condition of operation 1140 is satisfied and the process or processor ends. Otherwise, process or processor may proceed to operation 1470.

In operation 1470, a processor may direct the AP to reject registration of the UE to the registered AP by either denying the UE ability to register (e.g. authenticate) or by sending the UE a de-authentication message.

In operation 1480, the UE may re-scan the channels, repeating the above operations 1410-1430 to iteratively re-register with a new AP until the UE re-registers with an AP receiving an above threshold relative signal strength at operation 1440 and the process or processor ends.

Figure 15:
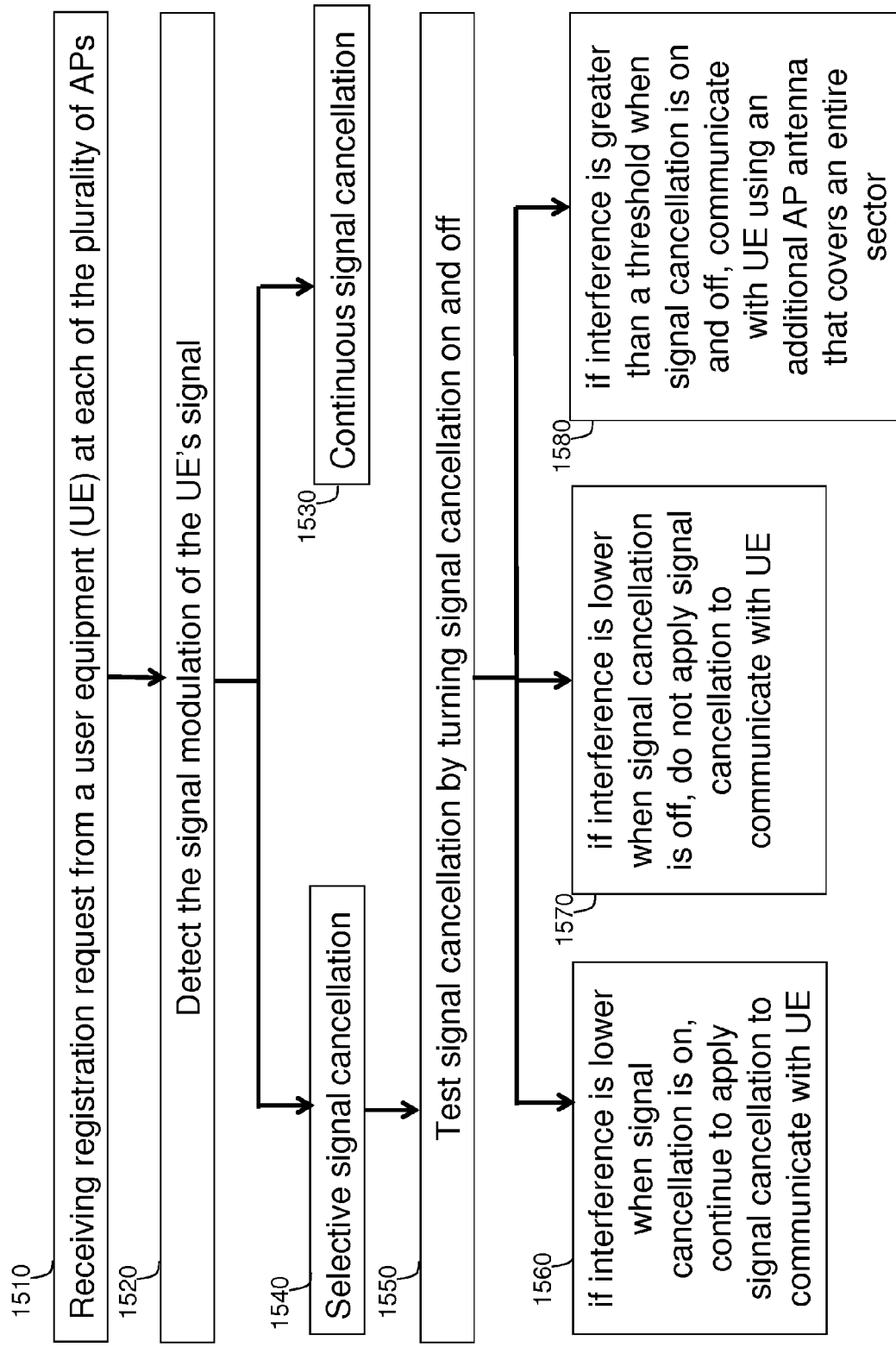

Reference is made to FIG. 15, which is a flowchart of a method in accordance with an embodiment of the invention. Operations described in reference to FIG. 15 may be executed using one or more processor(s) disposed in devices shown in FIGS. 7, 9, 12 and/or 13, such as, controllers 408, 708, 1203 and/or 1303 and/or APs 401, 701, 1209/1210 and/or AP#1-5 of FIG. 13.

In operation 1510, a processor may receive an indication that a signal is received from a single user equipment (UE) at each of two or more APs over the same channel. A relatively stronger power signal may be received over a primary lobe of a communication beam of one of the APs and a relatively weaker power signal may be received over a sidelobe of a communication beam of another one of the APs.

In some embodiments, a processor may detect the signal modulation of the UE's signal. In operation 1520, the processor may apply continuous signal cancellation if the modulation allows a below threshold interference level (e.g. 16-QAM requires greater than approximately a 14 dB SNR, but less than a threshold of 20 dB SNR). In operation 1530, the processor may apply the selective signal cancellation of operations 1550-1560 or 1570 if the modulation requires an above threshold maximum interference level (e.g. 64-QAM requires greater than the threshold of 20 dB SNR). Operations in 1520-1540 may be optional. In other embodiments, selective signal cancellation is automatically used and no modulation is detected.

In operation 1550, a processor may test the efficacy of signal cancellation by turning signal cancellation on and off to measure the UE signals at the registered AP or other APs.

In operation 1560, if interference at the AP is lower when signal cancellation is turned on, a processor may apply said signal cancellation for continued communication with said UE. The processor may apply signal cancellation to suppress sidelobe signals if the UE is determined to communicate over a sidelobe, but not applying signal cancellation if the UE is determined to communicate over a primary lobe. The processor may apply said signal cancellation by modulating the signals by coupling coefficients $h_{ij}$ of each beam i signal to each beam j signal.

In operation 1570, if interference is lower when signal cancellation is turned off, a processor may communicate with said UE without applying said signal cancellation.

In some embodiments, in optional operation 1580, if a greater than threshold amount of interference is experienced when signal cancellation is both on and off, a processor may control an additional AP to provide an additional channel of coverage, for example, using an antenna that covers an entire sector serviced by the two or more APs.

Other operations or orders of operations may be used.

According to an embodiment of the invention, a system and method is provided for operating a wireless network. Embodiments of the invention may provide additional sector coverage by allocating an additional access point upon detecting conditions indicating a use for additional coverage.

As will be appreciated by one skilled in the art, signal or sidelobe suppression, cancellation or reduction may refer to reducing interference e.g. due to sidelobe or other noise, to a below threshold amount or ratio such as SINR or a ratio of sidelobe gain to primary lobe gain. The threshold may be specified according to a communication standard, modulation standard, or other device or network requirement, and may allow some interference e.g. below a threshold level. For example, signal cancellation of a signal may only reduce, suppress, or partially cancel interference, noise or sidelobe artifacts.

As will be appreciated by one skilled in the art "selective signal cancellation" may refer to activating or deactivating signal cancellation based on a condition related to the efficacy of the signal cancellation, e.g., if signal cancellation reduces signal interference or reduces said interference by an amount greater than when no signal cancellation is used. In contrast, "continuous signal cancellation" may refer to activating signal cancellation without testing or predicting the efficacy of the signal cancellation. Continuous signal cancellation may be activated, for example, based on a condition unrelated to interference, such as, the signal modulation or device, network or communication standards.

As will be appreciated by one skilled in the art, aspects of the present invention may be embodied as a system, method or an apparatus. As such, any limitations commonly associated with the term "FPGA" should not be construed to be implementation technology specific; rather it may be embodied in any logical apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

In some embodiments, access points (e.g., APs 401, 701, 1209/1210 and/or AP#1-5 of FIG. 13) may passively transfer signal information from UE to a controller (e.g. controller 408, 708, 1203 and/or 1303), which compares relative signal strengths between APs to thresholds, makes decisions regarding relative signal strength, determines whether to maintain or reject registration between UEs and APs for selective registration, and determines whether to apply signal cancellation. In another embodiment, such operations may be executed by another device in FIGS. 7, 9, 12 and/or 13, for example, access points (e.g., APs 401, 701, 1209/1210 and/or AP#1-5 of FIG. 13). In various embodiments, the processor(s) executing the operations of FIGS. 14 and 15 may be located, in part or in whole, in one or more controllers such as a base station controller (BSC) or other centralized network device, or in one or more APs or base stations (BSs).

The aforementioned block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for selective registration of a user equipment (UE) to one of a plurality of access points (APs), the method comprising:
   receiving an indication that each of a plurality of APs have received a signal from the UE;
   registering the UE to a first one of the plurality of APs to satisfy registration requirements associated with the UE;
   reporting to a controller information related to a signal strength of communication received at each AP from the UE; and
   if the signal strength received at the registered AP is less than the signal strength received at one or more non-registered APs by more than a threshold amount, rejecting the registration of the UE to the registered AP.

2. The method of claim 1 comprising, if the signal strength received at the registered AP is greater than or equal to the signal strength received at one of the non-registered APs by more than a threshold amount, maintaining the registration of the UE to the registered AP.

3. The method of claim 1 comprising, assigning the UE to register to a non-registered AP if the signal strength received at the non-registered AP is greater than or equal to the signal strength received at the registered AP by more than a threshold amount.

4. A system for selective registration of a user equipment (UE) to one of a plurality of access points (APs), the system comprising:
   a processor adapted to:
   receive an indication that each of a plurality of APs have received a signal from a single UE,
   register the UE to a first one of the plurality of APs to satisfy registration requirements associated with the UE;
   receive a report from each of the plurality of APs including information related to a signal strength of communication received at each of the APs from the UE, and
   if the signal strength received at the registered AP is less than the signal strength received at one or more non-registered APs by more than a threshold amount, reject the registration of the UE to the registered AP.

5. The system of claim 4, wherein if the signal strength received at the registered AP is greater than or equal to the signal strength received at one of the non-registered APs by more than a threshold amount, the processor is adapted to maintain the registration of the UE to the registered AP.

6. The system of claim 4, wherein the processor is further adapted to assign the UE to register to a non-registered AP if the signal strength received at the non-registered AP is greater than or equal to the signal strength received at the registered AP by more than a threshold amount.

* * * * *